(12) United States Patent
Richter

(10) Patent No.: US 12,384,210 B2
(45) Date of Patent: Aug. 12, 2025

(54) MECHANICALLY-ADAPTABLE HITCH GUIDE

(71) Applicant: Seegrid Corporation, Pittsburgh, PA (US)

(72) Inventor: Elijah Asher Richter, Glenshaw, PA (US)

(73) Assignee: SEEGRID CORPORATION, Pittsburgh, PA (US)

( * ) Notice: Subject to any disclaimer, the term of this patent is extended or adjusted under 35 U.S.C. 154(b) by 851 days.

(21) Appl. No.: 17/478,338

(22) Filed: Sep. 17, 2021

(65) Prior Publication Data

US 2022/0088980 A1 Mar. 24, 2022

Related U.S. Application Data

(60) Provisional application No. 63/080,300, filed on Sep. 18, 2020.

(51) Int. Cl.
*B60D 1/36* (2006.01)
(52) U.S. Cl.
CPC .................................. *B60D 1/363* (2013.01)
(58) Field of Classification Search
CPC ...................................................... B60D 1/363
USPC .......................................................... 280/477
See application file for complete search history.

(56) References Cited

U.S. PATENT DOCUMENTS

| | | | |
|---|---|---|---|
| 3,420,549 A | 1/1969 | Robinson | |
| 4,156,551 A | 5/1979 | Doi et al. | |
| 5,236,215 A | 8/1993 | Wylie | |
| 6,976,694 B1 | 12/2005 | Rayl et al. | |
| 8,091,914 B1 | 1/2012 | Long | |
| 2002/0145268 A1 | 10/2002 | Zechbauer | |

(Continued)

FOREIGN PATENT DOCUMENTS

| | | |
|---|---|---|
| AU | 2018287035 | 9/2023 |
| DE | 537062 | 10/1931 |

OTHER PUBLICATIONS

International Search Report and Written Opinion dated Jan. 11, 2022 issued in corresponding International Application No. PCT/US21/50907.

(Continued)

*Primary Examiner* — Valentin Neacsu
*Assistant Examiner* — Felicia L. Brittman-Alabi
(74) *Attorney, Agent, or Firm* — Onello & Mello, PC

(57) ABSTRACT

A hitch guide is provided that has wide ranging use for a plurality of different types of vehicles. The hitch guide can include at least one moveable guiding member, at least one moveable locking member configured to lock the guiding member in at least one fixed position and configured to disengage from the guiding member to enable the guiding member to move freely within an extended, defined range of motion. In various embodiments, a force applied to a portion of the guiding member causes the locking member and the guiding member to engage to lock the guiding member in the fixed position. Further, a force applied to a release of the locking member disengages the locking member and the guiding member is released from the fixed position, which enables a greater range of rotational motion of the guiding member to accommodate tight turns of a vehicle with cart in tow.

22 Claims, 20 Drawing Sheets

(56) References Cited

U.S. PATENT DOCUMENTS

2010/0264626 A1* 10/2010 Morehead ................ B60D 1/06
280/477

OTHER PUBLICATIONS

Extended European Search Report dated Oct. 2, 2024 issued in European Application No. 21870308.0.

* cited by examiner

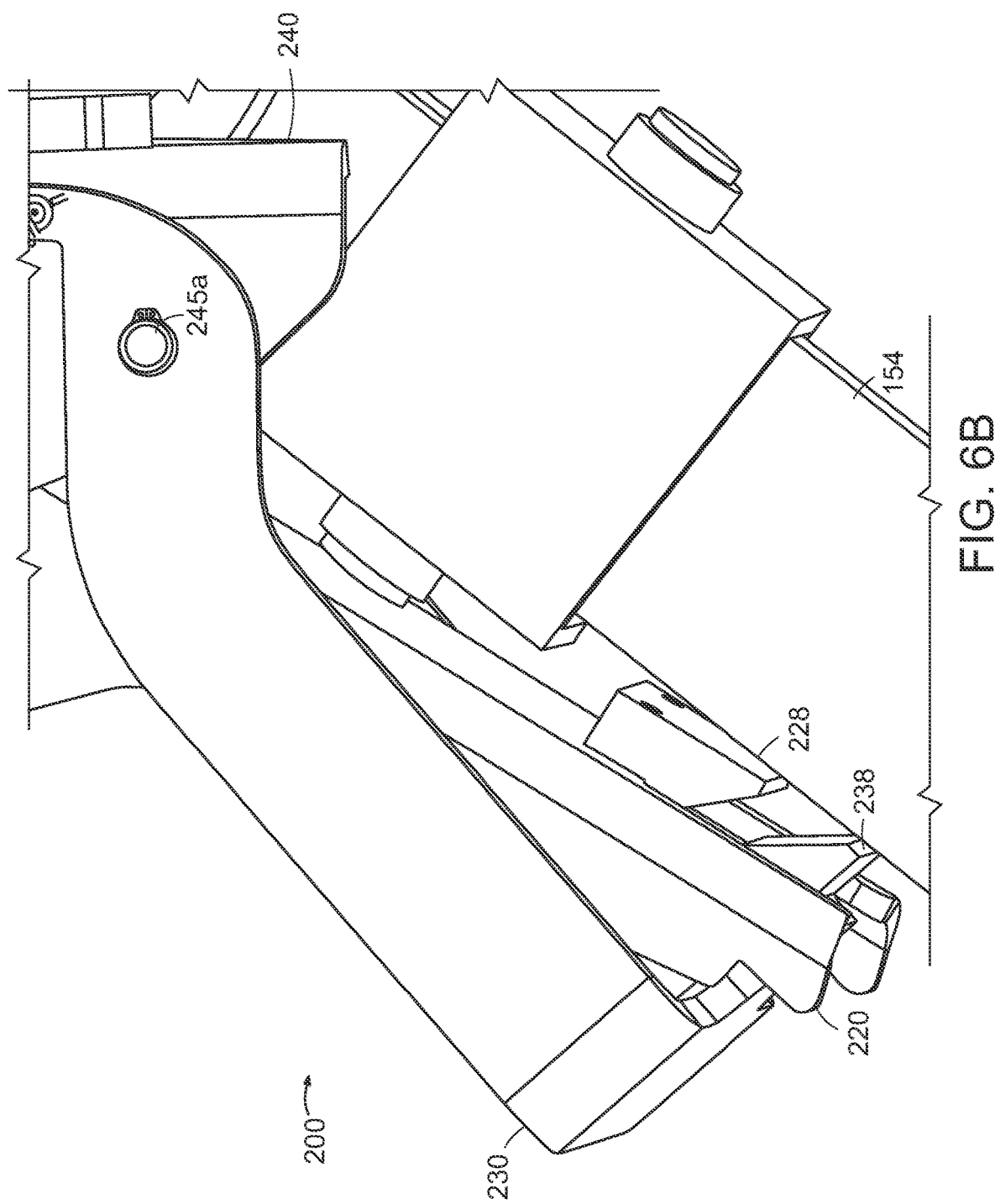

MECHANICALLY-ADAPTABLE HITCH GUIDE

CROSS REFERENCE TO RELATED APPLICATIONS

This application claims benefit of U.S. Provisional Application No. 63/080,300, filed Sep. 18, 2020, and entitled FOLD-AWAY HITCH GUIDE, which is hereby incorporated by reference in its entirety.

FIELD OF INTEREST

The present inventive concepts relate generally to a guide for coupling a payload to a hitch, and more particularly, but not exclusively, to a guide for coupling a payload to a hitch of an autonomous vehicle, such as an autonomous mobile robot, and/or manually operated vehicles.

BACKGROUND

A storage facility is a facility primarily used for storage of goods for commercial purposes, such as a warehouse. The storage is generally intended to be temporary, as such goods ultimately may be intended for a retailer, consumer or customer, distributor, transporter or other subsequent receiver. A warehouse can be a standalone facility, or can be part of a multi-use facility. Thousands of types of items can be stored in a typical warehouse. The items can be small or large, individual or bulk. It is common to load items on a pallet for transportation, and the warehouse may use pallets as a manner of internally transporting and storing items.

A well-run warehouse is well-organized and maintains an accurate inventory of goods. Goods can come and go frequently, throughout the day, in a warehouse. In fact, some large and very busy warehouses work three shifts, continually moving goods throughout the warehouse as they are received or needed to fulfill orders. Shipping and receiving areas, which may be the same area, are the location(s) in the warehouse where large trucks pick-up and drop-off goods. The warehouse can also include a staging area—as an intermediate area between shipping and receiving and storage aisles within the warehouse where the goods are stored. The staging area, for example, can be used for confirming that all items on the shipping manifest were received in acceptable condition. The staging area can also be used to build orders and pallets to fulfill orders that are to be shipped.

Goods in a warehouse tend to be moved in one of two ways, either by pallet or by cart (or trailer). A pallet requires a pallet transport for movement, such as a pallet jack, pallet truck, forklift, or stacker. A stacker is a piece of equipment that is similar to a fork lift, but can raise the pallet to significantly greater heights, e.g., for loading a pallet on a warehouse shelf. A cart requires a tugger (or "tow tractor"), which enables a user to pull the cart from place to place.

A pallet transport can be manual or motorized. A traditional pallet jack is a manually operated piece of equipment, as is a traditional stacker. When a pallet transport is motorized, it can take the form of a powered pallet jack, pallet truck, or forklift (or lift truck). A motorized stacker is referred to as a power stacker. A motorized pallet jack is referred to as a powered pallet jack, which an operator cannot ride, but walks beside. A pallet truck is similar to a powered pallet jack, but includes a place for an operator to stand.

As with motorized pallet transports, a tugger can be in the form of a drivable vehicle or in the form of a powered vehicle along the side of which the operator walks. In either form, a tugger includes a hitch that engages with a companion part on the cart, such as a sturdy and rigid ring or loop.

Various types of vehicles exist that can navigate without direct reliance on a human driver, such as autonomous mobile robots (AMRs), automatic guided vehicle (AGV), vision guided vehicles (VGV), and autonomous guided carts (AGCs), as examples. For purposes of brevity, such vehicles will be collectively referred to as autonomous vehicles. Autonomous vehicles in the form of pallet trucks and powered tuggers also exist. An autonomous vehicle can, therefore, be a mobile robot vehicle that can implement various types of auto-navigation technologies. Some of those technologies require the vehicle to follow markers or wires in the floor, while others use vision or lasers to navigate the vehicle without direct or remote control by an operator. Still other forms of auto-navigation technology can be used. Autonomous vehicles are often used in industrial applications to move materials around a manufacturing facility or a warehouse, such as in the case of AMR forklifts and AMR tuggers.

When connecting a towable payload, such as a cart, to a hitch of an autonomous vehicle, a high degree of precision is required relative to the navigational accuracy of the autonomous vehicle. Furthermore, payloads are often inconsistently placed at their designated pickup locations. This problem is generally addressed by using fixed guides to passively guide the payload coupling into the jaws of the hitch. Such fixed guides often take the form of a rigid ramp or rigid V-shaped plate secured to the hitch. Even if somewhat effective in guiding the hitch, such guides can limit rotation of the tongue, and therefore the cart, relative to the vehicle. That is, a fixed, rigid, and passive guide will contact the tongue of the cart payload during tight turns, such as when navigating in narrow aisles, and consequently limit the turn radius of the vehicle and payload. Therefore, fixed guides on the left and right sides of the hitch have the disadvantage that they limit the movement of the tongue during turns and, thereby, limit the overall turn radius.

In some instances, a tongue of the payload can pivot on a horizontal axis, with the hitch defining the center of the rotation. A ramp guide with sides located below the hitch (or hitch plane) can guide and center the payload coupler ring and raise it to height of the hitch jaw, where it is captured. The payload tongue is subsequently held above the ramp guide when then hitch couples to the coupler ring. The ramp guide with sides located below the hitch has the disadvantage that it cannot be used for payloads in which the tongue is at a level of the hitch of the cart and above the ramp guide.

FIG. 1A is a side view of a vehicle 100 having a pintle hitch 110, in accordance with the prior art. In this embodiment, the vehicle 100 is an autonomous tugger that could optionally be manually operated. In this embodiment, the vehicle includes a body 102, which can house at least one battery and electromechanical controls used to drive and operate the vehicle. The vehicle can include three or more wheels 104. Between a backrest 105 and the body 102 can be defined an operator area 106 where an operator can stand and operate the vehicle using operator controls 107 or the operator can ride along while the vehicle auto-navigates. As an autonomous vehicle, an operator is not required. But those skilled in the art will appreciate that the inventive concepts disclosed herein are not limited to autonomous vehicles. Vehicles without a fold-away hitch guide in accordance with the inventive concepts, are known in the art.

In FIG. 1A, a cart 150 includes payload portion 152, a tongue 154, and a tow ring 156, all of which presently exist in the prior art. In operation, the vehicle's pintle hitch 110 can engage the tow ring 156 so that the vehicle 100 can tow the cart 150. Guides exist that are configured to help direct a tow ring of a cart toward the pintle hitch. These guides tend to be a rigid piece of a metal that provide a static ramp or static V-shaped member 111 that attaches to the pintle hitch 110 to direct the tow ring 156 toward the pintle hitch 110.

Referring to FIG. 1B, the rigid and static nature of the V-shaped guide 111 imposes rotational limitations on the tongue 154 once the tow ring 156 is engaged by the pintle hitch 110. Without the V-shaped guide 111, the tongue could rotate about ±100 degrees in the hitch plane P (see FIG. 1A) with respect to a central axis X of the vehicle, where a Y axis is perpendicular to the X axis and both the X axis and the Y axis lie in the same plane P. But with the rigid V-shaped guide 111, the tongue is limited in rotational range to a smaller angle ($\pm\Theta_1$) imposed by the left and right sides of the V-shaped guide, where $\Theta_1 \ll 100$ degrees.

It would be advantageous to provide a hitch guide that can effectively guide a hitch coupling to a hitch in the plane of the hitch, without significantly limiting the rotational range of payload tongue in tight turns. It would be advantageous to provide a hitch guide with movable parts, e.g., a hitch guide that can mechanically adapt to engage and guide a misaligned hitch coupling to a greater degree than provided by existing static, fixed, and passive guides. Other advantages of the inventive concepts will be apparent from this disclosure.

SUMMARY

In accordance with aspects of the inventive concepts, provided is a vehicle hitch guide apparatus configured to couple to a vehicle and/or a hitch and to guide a hitch coupling to the hitch. The apparatus comprises at least one linkage configured to take one of a plurality of linkage configurations in response to an external force, the plurality of linkage configurations includes at least one locked configuration to guide the hitch and at least one movable configuration having a defined range of motion.

In various embodiments, the at least one linkage is configured to adapt to take a first linkage configuration in response to the external force and to transition to a second linkage configuration in response to a change in the external force.

In various embodiments the first linkage configuration is a first locked configuration having a first angle relative to the hitch and the second linkage configuration is a second locked configuration having a second angle relative to the hitch that is different from the first angle.

In various embodiments, the first linkage configuration is a locked configuration having a first angle relative to the hitch and the second linkage configuration is a movable configuration wherein at least a portion of the at least one linkage is rotatable within the defined range of motion.

In various embodiments, the at least one movable configuration includes a movable configuration structured to that at least a portion of the linkage has a rotational range of motion of up to about 100 degrees relative to the hitch.

In various embodiments, the at least one linkage includes a first guiding member configured to be disposed on a first side of the hitch and a second guiding member configured to be disposed on a second side of the hitch, opposite the first side of the hitch. The first guiding member can be adaptable to take a first set of the plurality of linkage configurations on the first side of the hitch and the second guiding member can be adaptable to take a second set of the plurality of linkage configurations on the second side of the hitch.

In various embodiments, the at least one linkage comprises at least one locking member configured to lock or release the first guiding member to enable to the first guiding member to take each of the first set of the plurality of linkage configurations, and/or lock or release the second guiding member to enable to the second guiding member to take each of the second set of the plurality of linkage configurations.

In various embodiments, the at least one locking member comprises a first locking member configured to mechanically lock and release the first guiding member and a second locking member configured to mechanically lock and release the second guiding member.

In various embodiments, the first guiding member includes a first contact surface and the first locking member is configured to lock the first guiding member into a locked configuration in response to application of the external force to the first contact surface. Additionally, or alternatively, in various embodiments, the second guiding member includes a second contact surface and the second locking member is configured to lock the second guiding member into a locked configuration in response to application of the external force to the second contact surface.

In various embodiments, the first locking member includes a first release surface and the first locking member is configured to disengage from and release the first guiding member from a locked configuration in response to application of the external force to the first release surface. Additionally, or alternative, in various embodiments, the second locking member includes a second release surface and the second locking member is configured to disengage from and release the second guiding member from a locked configuration in response to application of the external force to the second release surface.

In various embodiments, the at least one locked configuration includes a plurality of locked configurations, each locked configuration having a different fixed angle relative to the hitch.

In various embodiments, the at least one movable configuration includes a movable configuration having a range of rotation with a magnitude of up to about 100 degrees relative to the hitch.

In various embodiments, the hitch apparatus can include one or more combinations of the above.

According to another aspect of the inventive concepts, provided is a hitch guide apparatus, including at least one linkage configured to couple to a vehicle and/or a hitch. The apparatus comprises a moveable guiding member configured to direct a hitch coupling to a hitch location and a moveable locking member responsive to an external force to lock the guiding member in at least one locked position and to disengage from and release the guiding member depending on a contact point of the external force on the guiding member and/or the locking member.

In various embodiments, the locking member is configured to lock the guiding member in a locked position in response to a force applied to the guiding member.

In various embodiments, the locking member is configured to disengage from and release the guiding member from a locked position when the external force is applied to the locking member.

In various embodiments, the locking member is configured to lock the guiding member in a locked position when the external force is transitioned from the locking member to the guiding member.

In various embodiments, the locking member and the guiding member are rotatable relative to the hitch.

In various embodiments, the locking member and the guiding member are configured to rotate about different axes.

In various embodiments, the different axes are parallel to each other.

In various embodiments, the guiding member and the locking member are rotatable up to about 100 degrees away from the hitch.

In various embodiments, the apparatus further comprises a base configured to couple to the vehicle and/or the hitch, wherein the locking member and/or the guiding member are coupled to the base.

In various embodiments, the guiding member is rotatably coupled to the base at a first axis and the locking member is rotatably coupled to the base at a second axis that is parallel to the first axis.

In various embodiments, the base comprises a stop configured to limit the rotation of the guiding member and/or the locking member.

In various embodiments, the locking member is configured to lock the guiding member in one of a plurality of locked positions.

In various embodiments, the locking member is configured to disengage from and release the guiding member to enable the guiding member to transition from a first locked position to a second locked position.

In various embodiments, an angle of the guiding member to the hitch is greater in the second locked position than in the first locked position.

In various embodiments, the locking member is configured to disengage and release the guiding member from any of the plurality of locked positions to enable the guiding member to move freely within a defined range of motion.

In various embodiments, the locking member and the guiding member are each biased to a home position by one or more springs when the external force is not applied.

In various embodiments, the guiding member has a distal end that includes a contact surface configured to receive the external force, the locking member has a distal end that includes a release surface configured to receive the external force, and in the home position, the release surface of the locking member extends beyond the contact surface of the guiding member In various embodiments, the home position, the release surface of the locking member extends through an opening defined by or in the guiding member.

In various embodiments, the guiding member and the locking member have coplanar travel paths.

In various embodiments, the guiding member and the locking member rotate within the same plane about different axes.

In various embodiments, the locking member includes at least one notch configured to receive a portion of the guiding member to lock the guiding member in the at least one locked position. Additionally, or alternatively, in various embodiments, the guiding member includes at least one notch configured to receive a portion of the locking member to lock the guiding member in the at least one locked position.

In various embodiments, the at least one linkage includes a first linkage and a second linkage configured to be coupled to the vehicle and/or hitch on opposite sides of the hitch.

In various embodiments, the first linkage comprises a first movable guiding member configured to direct a hitch coupling to a hitch location and a first moveable locking member responsive to an external force to lock the first guiding member in at least one locked position and to disengage from and release the first guiding member depending on a contact point of the external force on the first guiding member and/or the first locking member. And the second linkage comprises a second moveable guiding member configured to direct a hitch coupling to a hitch location and a second moveable locking member responsive to an external force to lock the second guiding member in at least one locked position and to disengage from and release the second guiding member depending on a contact point of the external force on the second guiding member and/or the second locking member.

In various embodiments, the hitch apparatus can include one or more combinations of the above.

In accordance with aspects of the inventive concepts, provided is a hitch guide apparatus, including a first base configured to couple to a vehicle and/or a hitch at a first side of the hitch; a first guiding member rotatably coupled to the first base and including a first guide surface to guide a hitch coupling; a first locking member rotatably coupled to the first base and responsive to an external force to lock the first guiding member in at least one locked position and to disengage from and release the first guiding member depending on a contact point of the external force on the first guiding member and/or the first locking member; a second base configured to couple to the vehicle and/or the hitch at a second side of the hitch; a second guiding member rotatably coupled to the second base and including a second guide surface to guide the hitch coupling; and a second locking member rotatably coupled to the second base and responsive to an external force to lock the second guiding member in at least one locked position and to disengage from and release the second guiding member depending on a contact point of the external force on the second guiding member and/or the second locking member.

In various embodiments, the first and second locking members are configured to lock the respective first or second guiding member in a locked position in response to a force applied to the first or second guiding member.

In various embodiments, the first and second locking members are configured to disengage from and release the respective first or second guiding member from a locked position when the external force is applied to the first or second locking member.

In various embodiments, the first and second locking members are configured to lock the respective first or second guiding member in a locked position when the external force is transitioned from the first or second locking member to the respective first or second guiding member.

In various embodiments, the first locking member and the first guiding member are configured to rotate about different axes. Additionally, or alternatively, in various embodiments, the second locking member and the second guiding member are configured to rotate about different axes.

In various embodiments, the different axes are parallel to each other.

In various embodiments, the first guiding member and the first locking member are rotatable up to about 100 degrees away from the hitch. Additionally, or alternatively, in various embodiments, the second guiding member and the second locking member are rotatable up to about 100 degrees away from the hitch.

In various embodiments, the first base comprises a first stop configured to limit the rotation of the first guiding member and/or the first locking member. Additionally, or alternatively, in various embodiments, the second base comprises a second stop configured to limit the rotation of the second guiding member and/or the second locking member.

In various embodiments, the first locking member is configured to lock the first guiding member in one of a plurality of locked positions. Additionally, or alternatively, in various embodiments, the second locking member is configured to lock the second guiding member in one of a plurality of locked positions.

In various embodiments, the first locking member is configured to disengage from and release the first guiding member to enable the first guiding member to transition from one locked position to another locked position. Additionally, or alternatively, in various embodiments, the second locking member is configured to disengage from and release the second guiding member to enable the second guiding member to transition from one locked position to another locked position.

In various embodiments, an angle of the first or second guiding member relative to the hitch is different in each of the plurality of locked positions.

In various embodiments, the first locking member is configured to disengage and release the first guiding member from any of the plurality of locked positions to enable the first guiding member to move freely within a defined range of motion. Additionally, or alternatively, in various embodiments, the second locking member is configured to disengage and release the second guiding member from any of the plurality of locked positions to enable the second guiding member to move freely within a defined range of motion.

In various embodiments, the first locking member and the first guiding member are each biased to a first home position by one or more first springs when the external force is not applied. Additionally, or alternatively, in various embodiments, the second locking member and the second guiding member are each biased to a second home position by one or more second springs when the external force is not applied.

In various embodiments, the first guiding member has a distal end that includes a first contact surface configured to receive the external force, the first locking member has a distal end that includes a first release surface configured to receive the external force, and in the first home position, the first release surface of the first locking member extends beyond the first contact surface of the first guiding member.

In various embodiments, in the first home position, the first release surface of the first locking member extends through an opening defined by or in the first guiding member.

In various embodiments, the second guiding member has a distal end that includes a second contact surface configured to receive the external force, the second locking member has a distal end that includes a second release surface configured to receive the external force, and in the second home position, the second release surface of the second locking member extends beyond the second contact surface of the second guiding member.

In various embodiments, the second home position, the second release surface of the second locking member extends through an opening defined by or in the second guiding member.

In various embodiments, the first guiding member and the first locking member have coplanar travel paths. Additionally, or alternatively, in various embodiments, the second guiding member and the second locking member have coplanar travel paths.

In various embodiments, the first guiding member and the first locking member rotate within the same plane about different axes. Additionally, or alternatively, in various embodiments, the second guiding member and the second locking member rotate within the same plane about different axes.

In various embodiments, the first locking member includes at least one notch configured to receive a portion of the first guiding member to lock the first guiding member in the at least one locked position. Additionally, or alternatively, in various embodiments, the first guiding member includes at least one notch configured to receive a portion of the first locking member to lock the first guiding member in the at least one locked position.

In various embodiments, the second locking member includes at least one notch configured to receive a portion of the second guiding member to lock the second guiding member in the at least one locked position. Additionally, or alternatively, in various embodiments, the second guiding member includes at least one notch configured to receive a portion of the second locking member to lock the second guiding member in the at least one locked position.

In various embodiments, the hitch apparatus can include one or more combinations of the above.

In accordance with aspects of the inventive concepts, provided is an automatic guided vehicle, comprising a hitch and the hitch guide as described herein and/or above In various embodiments, the vehicle is a warehouse vehicle.

In various embodiments, the warehouse vehicle is a tugger.

In various embodiments, the hitch is a pintle hitch.

In accordance with another aspect of the inventive concepts, provided is a hitch guiding method, comprising configuring a vehicle with a hitch and the hitch guide apparatus as described herein and/or above. If a hitch coupling applies the external force to a guiding member, locking the guiding member into a locked position by a locking member. If the hitch coupling applies the external force to the locking member, the locking member disengaging from the guiding member and, when disengaged, the guiding member transitioning to another locked position. In each locked position, the guiding member directing the hitch coupling toward the hitch. The method further includes capturing the hitch coupling by the hitch.

In various embodiments, the method further comprises after hitch capture, in response to an external force applied to the locking member, the locking member disengaging from and releasing the guiding member to enable the guiding member to rotate within a defined range of motion with respect to the hitch.

In various embodiments, the defined range of motion with respect to the hitch is +/−100 degrees with respect to the hitch.

In accordance with another aspect of the inventive concepts, provided is a hitch guide apparatus including at least one moveable guiding member, at least one moveable locking member configured to lock the guiding member in a fixed position and configured to disengage from the guiding member to enable the guiding member to move freely within a defined range of motion. A vehicle can be configured with the hitch guide apparatus and a hitch.

In various embodiments, pressure applied to a portion of the guiding member causes the locking member and the guiding member to engage to lock the guiding member in the fixed position.

In various embodiments, pressure applied to a release surface of the locking member disengages the locking member and the guiding member is released from the fixed position to enable motion of the guiding member within the defined range of motion.

In various embodiments, the locking member comprises a distal end having a portion that includes a release surface and the release surface extends beyond a front face of the guiding member.

In various embodiments, the locking member and the guiding member are each biased to a home position by one or more springs.

In various embodiments, the guiding member and the locking member have coplanar travel paths.

In various embodiments, the guiding member and the locking member are rotatable within the same plane but about different axes.

In various embodiments, the locking member and/or the guiding member includes at least one notch configured to receive a portion of the guiding member and/or locking member to lock the guiding member in the fixed position.

In various embodiments, the guiding member and the locking member form an apparatus having a proximal end configured for fixed coupling at a side of a hitch, wherein the guiding member is configured to guide a hitch coupler to the hitch.

In various embodiments, the hitch coupler is a tow ring coupler.

In accordance with aspects of the inventive concepts, provided is a hitch guide system including a first and a second moveable guiding member and a first and a second moveable locking member. Each locking member is configured to lock the respective guiding member in a fixed position and configured to disengage from the respective guiding member to enable the respective guiding member to move freely within a defined range of motion.

In various embodiments, each guiding member and respective locking member form an apparatus having a proximal end configured for fixed coupling at a side of an opposite side of a hitch, wherein each guiding member is configured to guide a hitch coupler to the hitch.

In various embodiments, the hitch coupler is a tow ring coupler.

In accordance with aspects of the inventive concepts, provided is an automatic guided vehicle including the hitch guide system as described above and a hitch.

In various embodiments, the vehicle is a warehouse vehicle.

In various embodiments, the warehouse vehicle is a tugger.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. In the drawings:

FIGS. 6A and 6B are perspective views of the hitch guide of FIG. 3A with the tow ring captured, in accordance with aspects of the inventive concepts;

DETAILED DESCRIPTION OF PREFERRED EMBODIMENT

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

In accordance with aspects of the inventive concepts, provided is a vehicle hitch guide apparatus configured to couple to a vehicle and/or a hitch and to guide a hitch coupling to the hitch. In various embodiments, the apparatus comprises at least one linkage configured to take one of a plurality of linkage configurations in response to an external force, the plurality of linkage configurations includes at least one locked configuration and at least one movable configuration having a defined range of motion. In a locked configuration, at least a portion of the linkage, e.g., a guiding member, is configured to take a locked position to stably guide the hitch coupling to the hitch. In a movable configuration, at least a portion of the linkage, e.g., the guiding member, can move to a different locked position, e.g., to widen a capture angle relative to the hitch. In another movable configuration, at least a portion of the linkage, e.g., the guiding member, can move freely within a limited and defined range of motion to avoid obstruction of a cart tongue to which the hitch coupling is attached, e.g., after hitch capture and in tight turns.

Figure 1A:
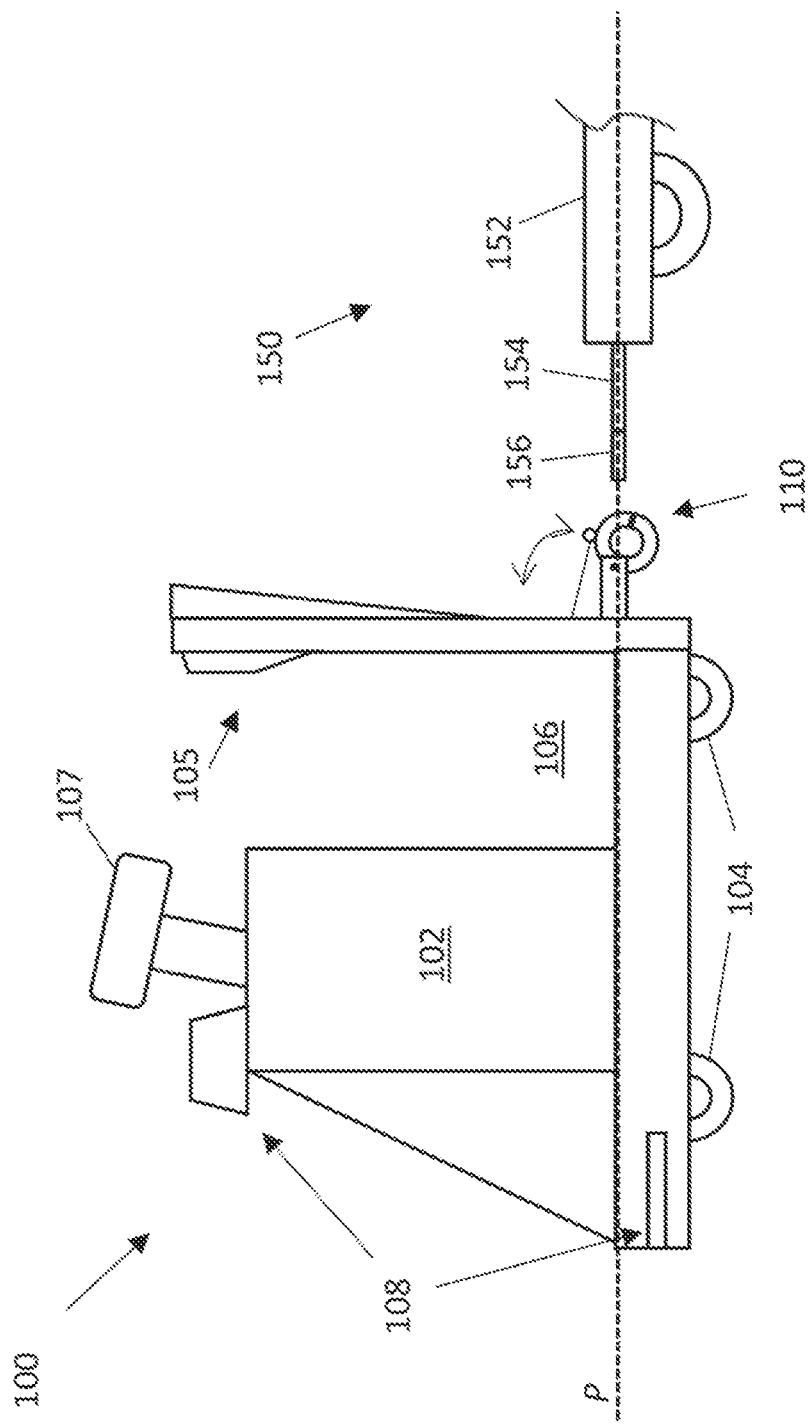
FIG. 1A is a side view of a vehicle having a hitch and towing a cart, in accordance with the prior art.
Figure 1B:
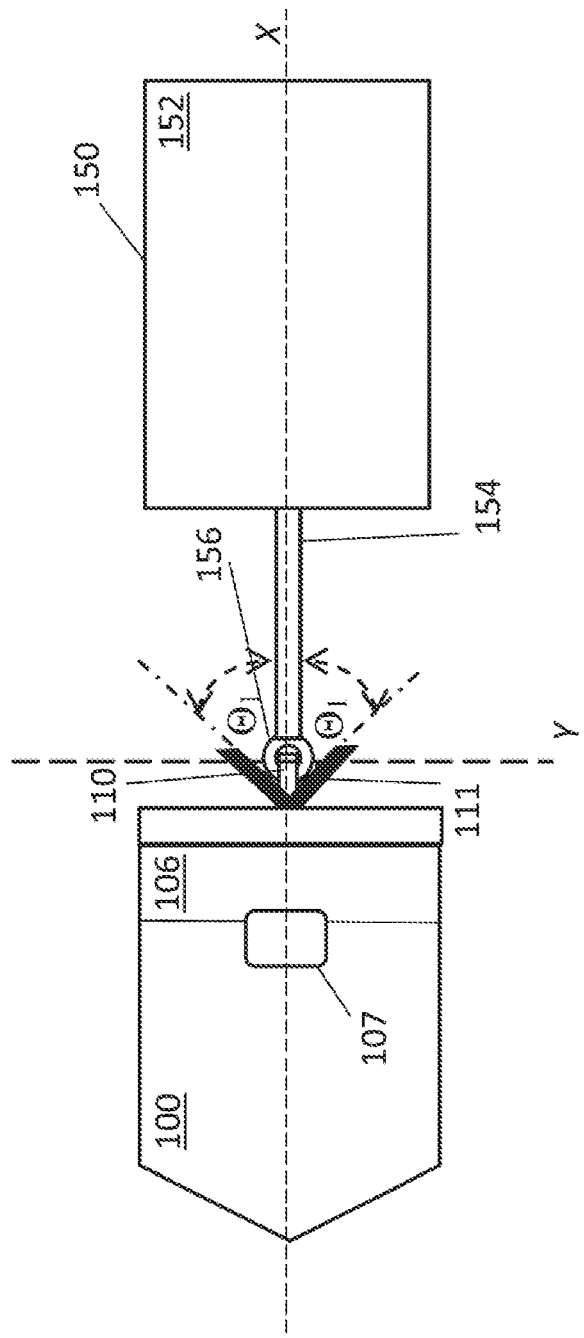
FIG. 1B is a top view of the vehicle with the cart in tow of FIG. 1A, in accordance with the prior art.
Figure 2:
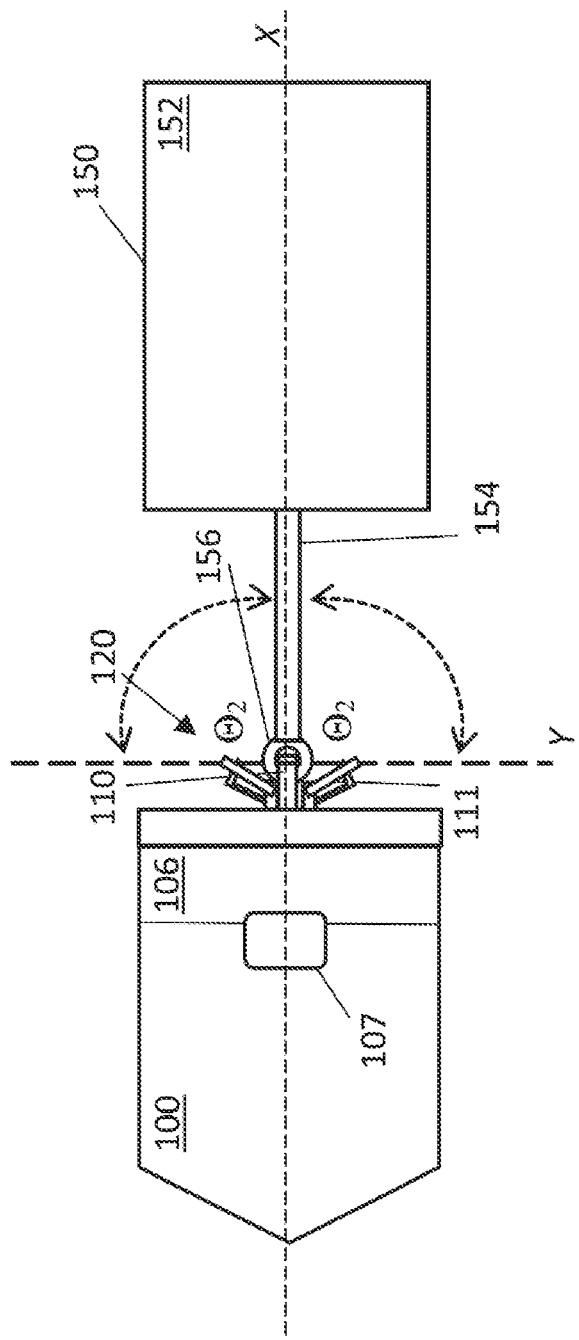
FIG. 2 is a top view of vehicle having a mechanically adaptable hitch guide, in accordance with the inventive concepts.

FIG. 2 is a top view of a vehicle, a hitch, and cart in tow, and a hitch guide, in accordance with the inventive concepts. In this view, the vehicle 100, the hitch 110, and the cart 150 are similar to those of FIGS. 1A and 1B. In this embodiment, the vehicle includes a hitch guide 120 in accordance with aspects of the inventive concepts. The hitch guide 120 enables a greater range of capture and rotation than other hitch guides. As an example, in FIG. 2, the hitch guide enables a rotation $\pm \approx 100$ degrees (i.e., $\pm \Theta_2$) of the cart 150 and cart tongue 154, e.g., up to about 180 degrees. When compared to FIG. 1A, $\Theta_2 > \Theta_1$. The hitch guide can include at least one linkage that is adaptable in response to at least one external force, wherein each linkage can take a plurality of different linkage configurations. The plurality of linkage configurations can include at least one locked guiding linkage configuration and at least one unlocked linkage configuration.

FIGS. 3A-3D are views of an embodiment of the hitch guide 120, in accordance with aspects of the inventive concepts. The hitch guide 120 can be mounted to or otherwise form part of a wide variety of hitches and/or vehicles. Such vehicles can include, but are not limited to, autonomous tuggers (e.g., see FIGS. 1A, 1B, and 2). In various embodiments, the hitch guide 120 is mechanically-adaptable to effectively guide a hitch coupling to a hitch and enable a greater rotational range of a cart about or around a vertical axis Z of the hitch 110 once the cart's hitch coupling is captured by the hitch.

In various embodiments, the hitch guide 120 can include two mechanically adjustable linkages, one on each side of the hitch. Each linkage can be adaptable to mechanically adjust its angle relative to the hitch, as well as to a central axis X of the vehicle and the vertical axis Z of the hitch. Each linkage is adaptable to take one of a plurality of fixed or locked positions, states, and/or configurations while guiding a hitch coupling to the hitch. Therefore, the hitch guide is mechanically adaptable during the guide and capture operation. Each linkage is also configured to mechanically adjust its angle relative to the hitch (and relative to the central axis X) during and after hitch capture. During capture, the linkage can widen its angle relative to the hitch (and central axis X) to guide a hitch coupling offset beyond the range of the linkage in a first locked position. After capture of the hitch coupling by the hitch, the linkage can unlock to enable a greater rotational range of motion of a tongue of a cart in tight turns, wherein the maximum angle is greater than the angle with the linkage in a locked position. These can be referred to as movable linkage configurations, rotational linkage configurations, and/or passive configurations. In various embodiments, therefore, the hitch guide 120 includes movable parts that can mechanically adapt to engage and guide a misaligned hitch coupling, e.g., a tow ring, to a greater degree than provided by existing static, fixed, and passive guides. In various embodiments, the movable parts of the hitch guide 120 can also mechanically adapt to enable a cart tongue to move without obstruction from the hitch guide within a limited and defined range of motion, e.g., ±100 degrees, after capture.

In FIGS. 3A-3D, the hitch 110 is a pintle hitch having jaws that open to receive a tow ring and that close to capture and secure the tow ring. Thus, hitch 110 is configured to receive and capture the hitch coupling 156 to accomplish a secure towable engagement. In other embodiments, the hitch and hitch coupling could take other forms, so long as the hitch is configured to receive and form a towable engagement with the hitch coupling. The hitch coupling 156 is located at a distal end of a tongue 154 of the cart 150, i.e., distal from a cargo portion 152 of the cart (see FIG. 2).

In various embodiments, such as those of FIGS. 3A through 3D, the hitch guide 120 comprises a plurality of linkages. In this embodiment, the hitch guide includes a linkage 200 and a linkage 300. Linkage 200 can be disposed on a first, or left, side of the hitch 110 and linkage 300 can be disposed on a second, or right, side of the hitch. That is, the linkages can be disposed on opposite sides of the hitch.

Linkage 200 can comprise a moveable guiding member 220 and a corresponding moveable locking member 230. The locking member 230 is configured to mechanically restrain motion of the moveable guiding member 220 during hitch coupling in some cases and to enable an increased range of motion of the guiding member 220 during hitch coupling in other cases. The locking member 230 is also configured to enable an increased range of motion of the guiding member 220 after hitch coupling, e.g., during tugging of a payload (e.g., a cart) by the vehicle 100. In some embodiments, after capture of the hitch coupling, the linkage 200 can open to about 100 degrees relative to the central axis X of the vehicle (see $\Theta_2$ of FIG. 2), wherein the hitch coupling 156 and tongue 154 rotate about the vertical axis Z of the hitch. In various embodiments, the locking member 230 can secure the guiding member 220 in one of a plurality of locked positions during the guiding and capture process.

Linkage 300 can comprise a moveable guiding member 320 and a corresponding moveable locking member 330. The locking member 330 is configured to mechanically restrain motion of the moveable guiding member 320 during hitch coupling in some cases and to enable an increased range of motion of the guiding member 320 during hitch coupling in other cases. The locking member 330 is also configured to enable an increased range of motion of the guiding member 320 after hitch coupling, e.g., during tugging of a payload (e.g., a cart) by the vehicle 100. In some embodiments, after capture of the hitch coupling, the linkage 300 can open to about 100 degrees relative to the central axis X of the vehicle (see $\Theta_2$ of FIG. 2), which can be measured from and pass through a vertical axis Z of the hitch. In various embodiments, the locking member 330 can secure the guiding member 320 in one of a plurality of locked positions during the guiding and capture process.

In various embodiments, the guiding members 220, 320 function to guide the hitch coupling 156 into the jaws of the pintle hitch 110. The locking members 230, 330 function to constrain movement of its respective guiding member 220, 320 between a plurality of locked positions while the hitch coupling 156 is in contact with and travels along the guiding member 220, 320 as the guiding member guides the hitch coupling 156 to the hitch 110 until the hitch coupling is captured by the hitch. In various embodiments, the locking members 230, 330 are configured to limit a range of motion of their respective guiding members 220, 320 in the horizontal direction, e.g., in the hitch plane P, while the guiding member guides the hitch coupling to the hitch. Additionally, in various embodiments, each locking member 230, 330 is configured to release (or unlock) its respective guiding member 220, 320 to allow its guiding member to move within a larger, extended range of motion, e.g., $\pm\Theta_2$ of FIG. 2, in the horizontal direction, e.g., within the hitch plane P. Each of the locking members 230, 330 is configured to release its guiding member 220, 320 in response to physical engagement by the hitch coupling 156 of the cart 150 prior to capture, or in response to physical engagement by the cart tongue 154 after capture.

In various embodiments, each linkage includes a base. In this embodiment, linkage 200 includes base 240 and linkage 300 includes base 340. The base 240, 340 can be steadfast and immovable with respect to the hitch 110, the vehicle 100 from which the hitch extends, the guiding member 220, 320, and the locking member 230, 330. In this embodiment, each base 240, 340 securely couples to the hitch 110 and/or to the vehicle 100 to which the hitch is connected. For linkage 200, the guiding member 220 and the locking member 230 are coupled to the base 240 by hinge pins. Similarly, for linkage 300, the guiding member 320 and the locking member 330 are coupled to the base 340 by hinge pins. The linkages 200, 300 are disposed sufficiently close to the hitch 110 so that a hitch coupling 156 traveling along a guiding member 220, 320 would be led by the guiding member to be received by the hitch 110. In various embodiments, the linkages 200, 300 guide the hitch coupling 156 in the hitch plane P (see FIG. 1A), wherein the hitch plane can be considered to be parallel to the ground surface on which the vehicle and cart travel. The hitch and hitch coupling can be considered to lie in the hitch plane P. The vertical hitch axis Z can be perpendicular to the hitch plane P.

In various embodiments, the linkages 200, 300 are structured and arranged so that each guiding member 220, 320 and its locking member 230, 330 have horizontal travel directions. Additionally, in various embodiments, the guiding members 220, 320 and the locking members 230, 330 have different vertical axes of rotation, wherein the different axes can be parallel to each other. These axes of rotation of each guiding member 220, 320 and its locking member 230, 330 are defined by the hinge pin connections to the base.

Various hinge pins 245, 247, 345, 347 connecting the guiding members and the locking members to their respective bases 240, 340 enable rotational travel of each member. This configuration enables the hitch guide 120 to guide the hitch coupling 156 of the cart 150 to a hitch 110 of a vehicle for capture, even when the alignment of the hitch coupling is off-centered relative to the hitch 110, e.g., offset to the right side or left side of the hitch. In either case, the hitch guide 120 is configured to guide the off-centered or offset hitch coupling 156 to the hitch 110 so that the hitch coupling 156 is effectively directed to and captured by the hitch 110. Once engaged in this manner, towing of the cart 150 can commence.

Figure 3A:
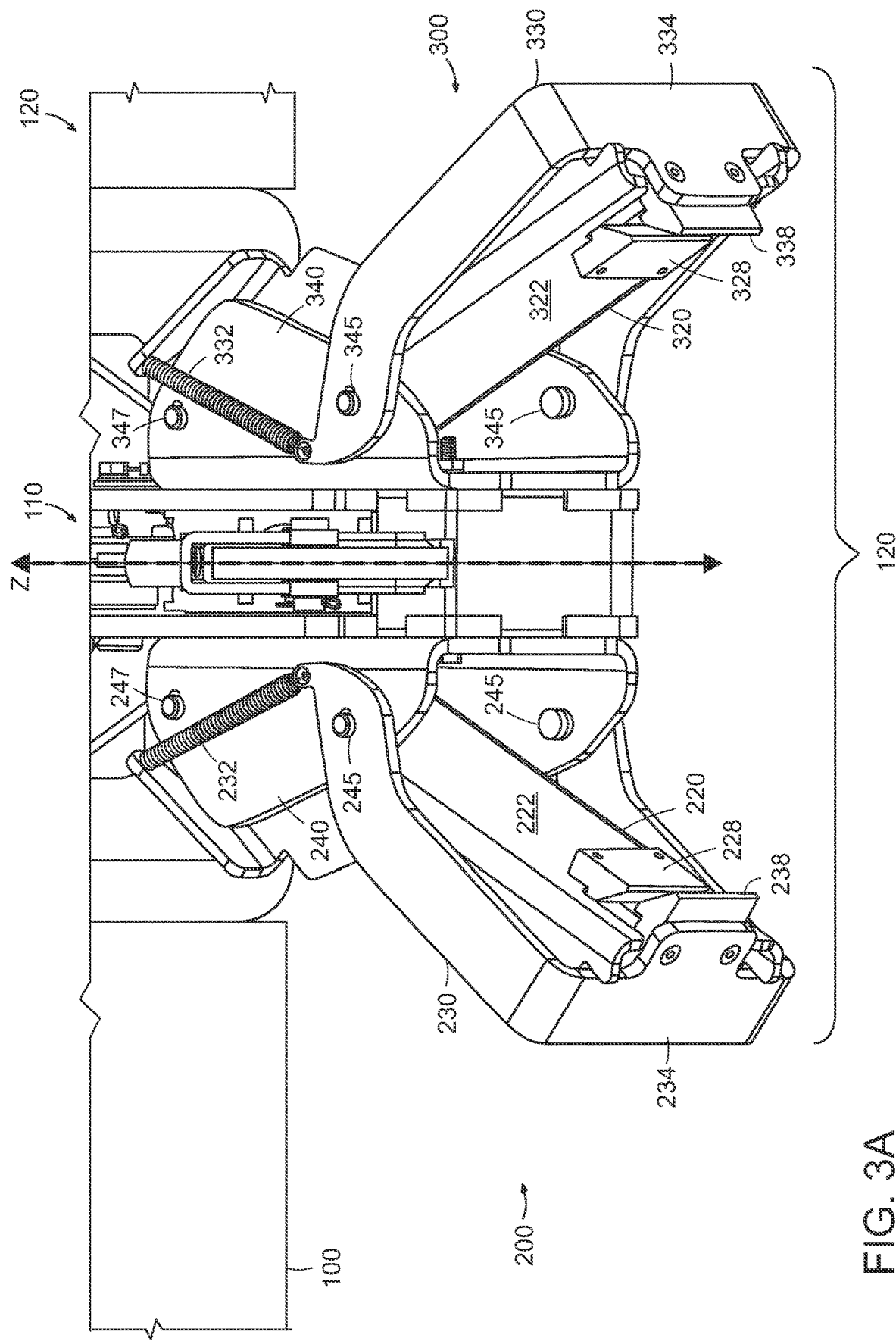
FIG. 3A is a perspective view of a hitch guide, in accordance with aspects of the inventive concepts.
Figure 3B:
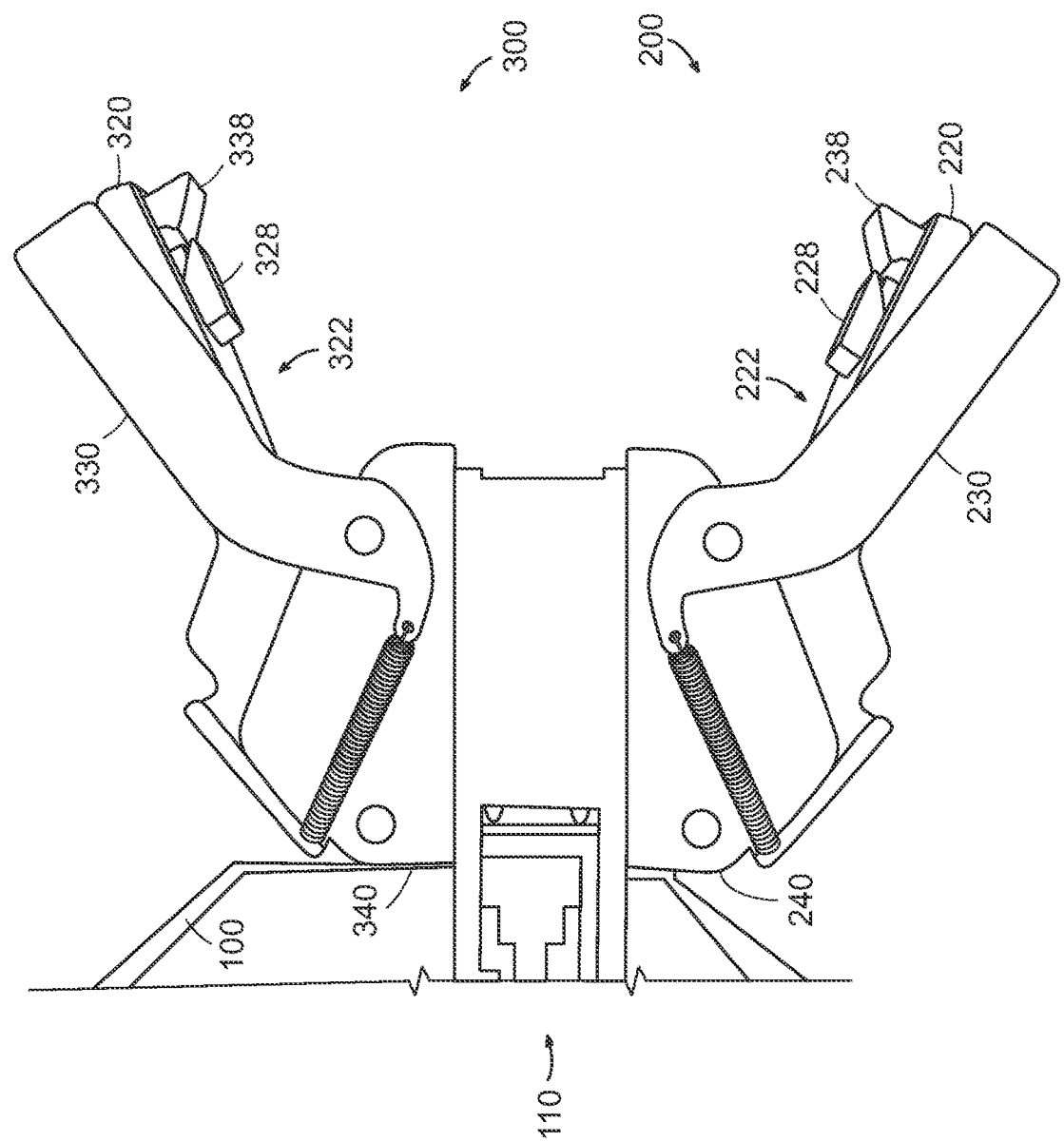
FIG. 3B is a top view of the hitch guide of FIG. 3A, in accordance with aspects of the inventive concepts.
Figure 3C:
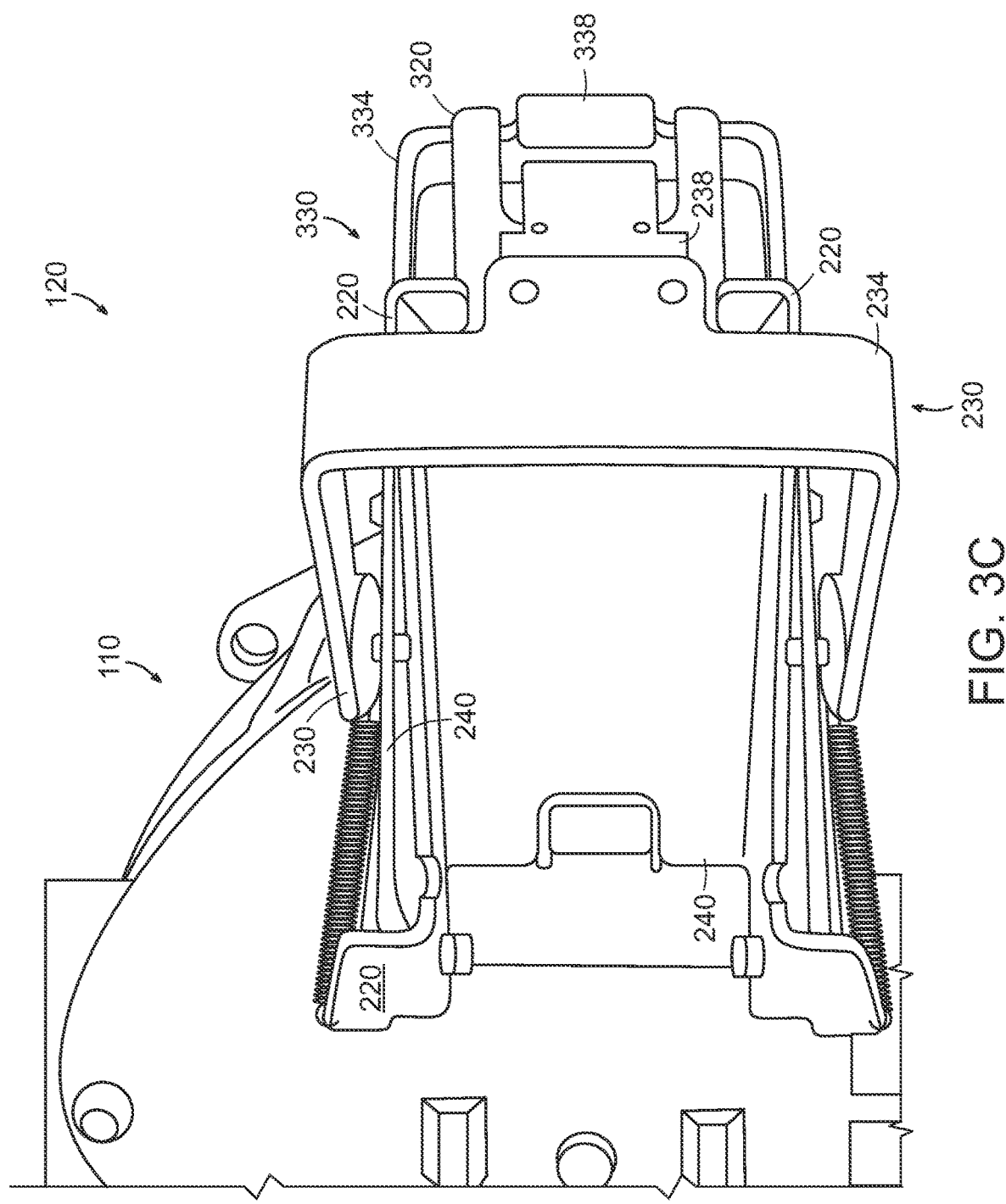
FIG. 3C is a side view of the hitch guide of FIG. 3A, in accordance with aspects of the inventive concepts.
Figure 3D:
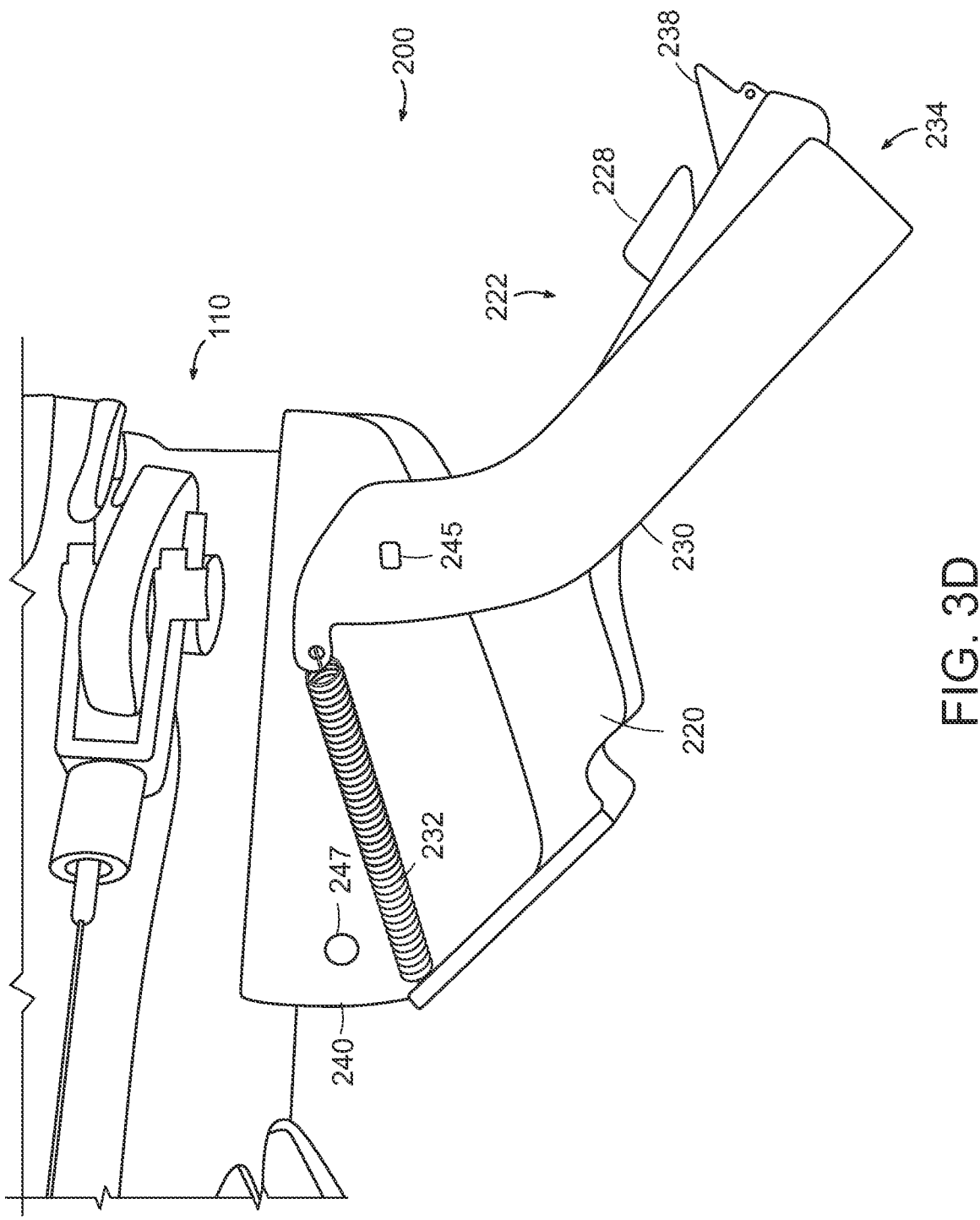
FIG. 3D is a partial top view of the hitch guide of FIG. 3A, in accordance with aspects of the inventive concepts.
Figure 4:
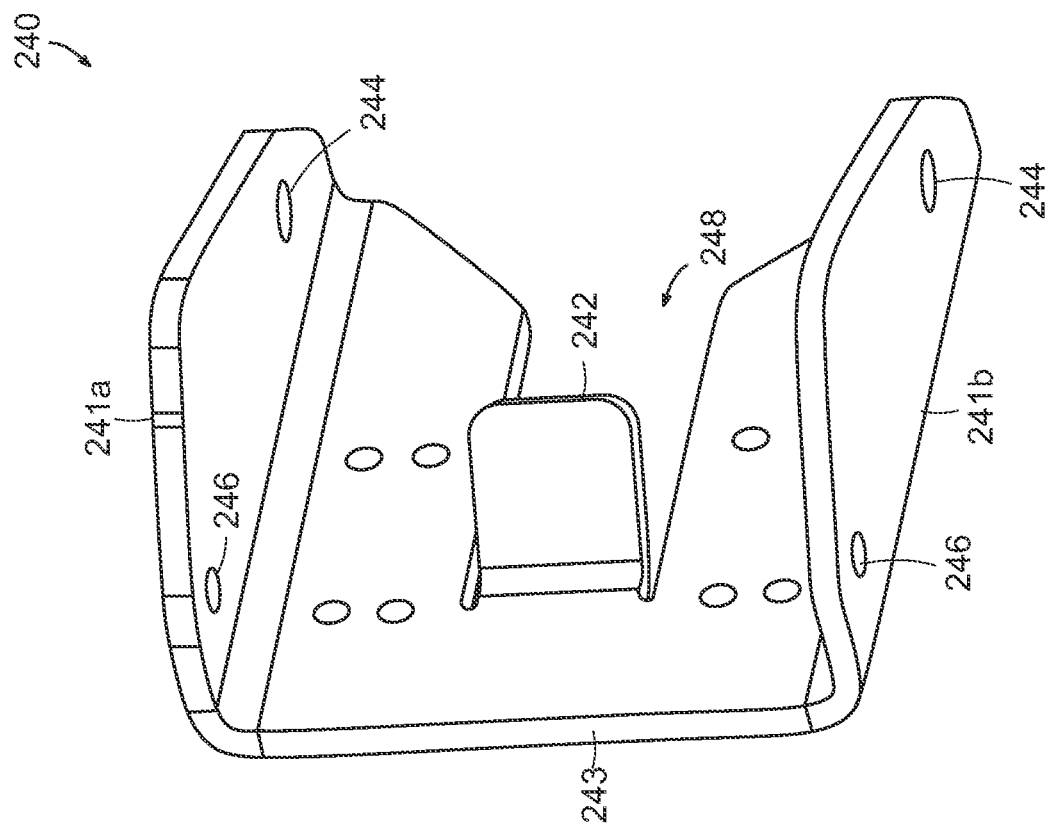
FIG. 4 is a perspective view of a base member of the hitch guide of FIG. 3A, in accordance with aspects of the inventive concepts.

FIG. 4 is a perspective view of an embodiment of the base 240 of first linkage 200 of the hitch guide 120 of FIGS. 3A-3D, in accordance with aspects of the inventive concepts. The base 240 includes first and second sides 241a,b extending in the same direction from a central portion 243. The first and second sides 241a,b can be parallel or substantially parallel to each other. In this embodiment, the central portion 243 lies in a plane that is perpendicular or substantially perpendicular to the first and second sides 241a,b.

Figure 8:
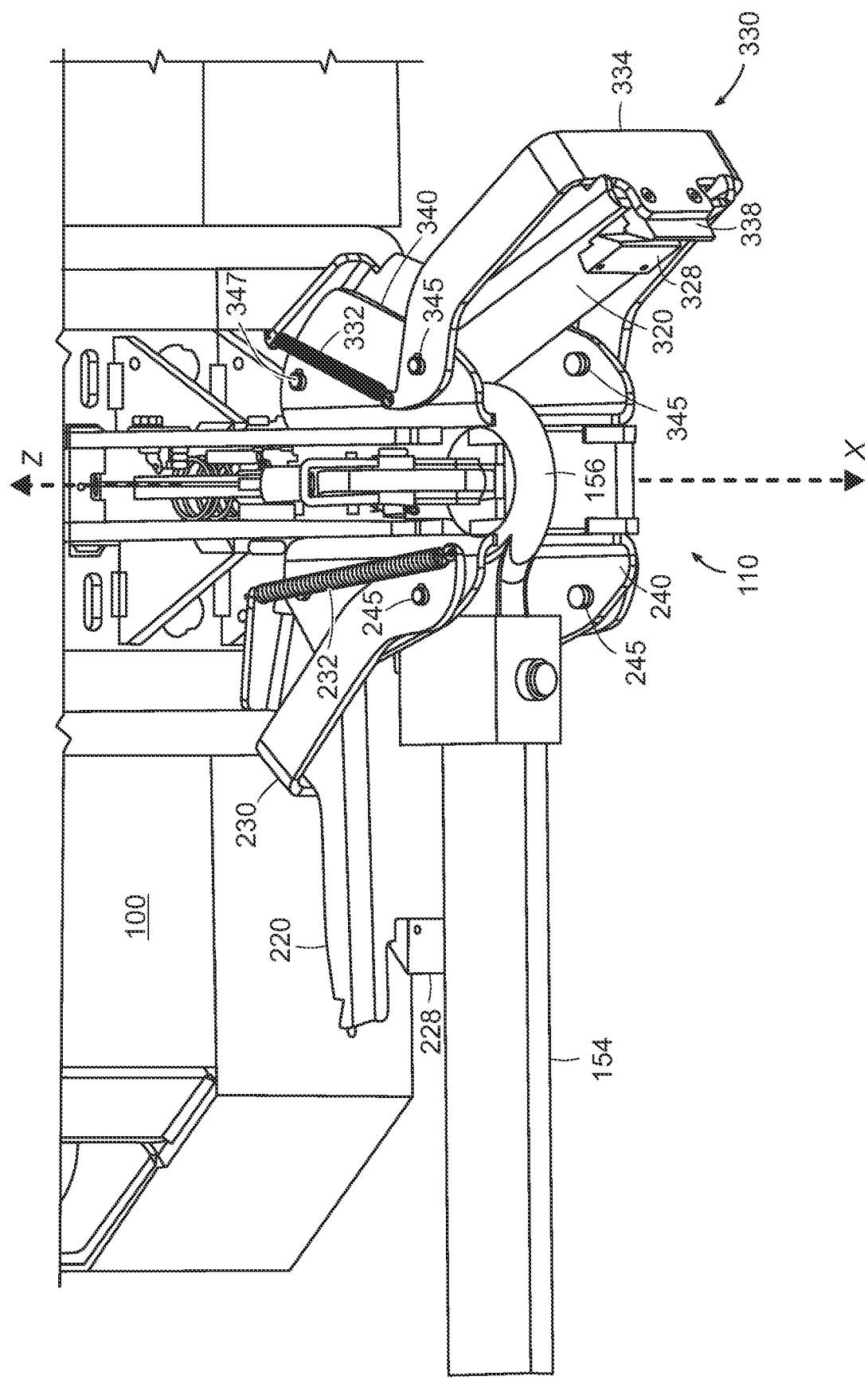
FIG. 8 is a perspective view of the hitch guide of FIG. 3A with the tow ring captured and a cart tongue at about 100 degrees from a central axis, in accordance with aspects of the inventive concepts.

A base stop 242 extends from the central portion 243 of the base 240, in this embodiment. The stop 242 can provide a fixed limit to the range of rotational motion of the guiding member 220. In this embodiment, the stop 242 takes the form of a tab formed from a cutout of the central portion 243 that is bent between the first and second sides 241,a,b. A slot 248 is formed in the central portion 243 of the base 240, wherein the slot is adjacent to the stop and between the first and second sides 241a,b. In this embodiment, the base 240 is formed so that when the tongue 154 of the cart 150 rotates and the hitch guide 120 linkage 200 is in an unlocked state, e.g., as seen in FIG. 8, the tongue 154 of the cart moves within the slot or cutout 248 of the base 240 as it rotates. That is, in various embodiments, other than the stop 242, the base does not limit the range of motion of the guiding member 220, locking member 230, or tongue 154 of the cart during turns. The stop 242 restricts or limits the movement of the guiding member 220, and thereby the tongue 154 of the cart, and defines a terminus of the slot 248 and rotation of the guiding member and locking member. The stop, therefore, can define the maximum rotation of the guiding member, or define a range of motion or limit of the guiding member.

In the embodiment shown, the first side 241a is arranged as a top side of the base and the second side 241b is arranged as a bottom side of the base, opposite the top side. The first side and the second side include corresponding first hinge pin holes 244 that are vertically aligned to define a first axis of rotation for the locking member 230. The first side and the second side include corresponding second hinge pin holes 246 that are vertically aligned to define a second axis of rotation for the guiding member 220, which is different form the first axis of rotation of the locking member. In various embodiments, the first and second axes of rotation are in parallel.

In accordance with aspects of the inventive concepts, the second linkage 300 of the hitch guide 120 of FIGS. 3A-3D includes a base 340 that is substantially similar to base 240. In various embodiments, base 340 is the mirror of base 240.

In the present embodiment, hinge pins 245 couple the locking member 230 to the base 240 through first hinge pin holes 244 and hinge pins 247 couple the guiding member 220 to the base 240 through second hinge pin holes 246. Similarly, hinge pins 345 couple the locking member 330 to the base 340 through first hinge pin holes 344 and hinge pins 347 couple the guiding member 320 to the base 340 through hinge pin holes 346. In other embodiments, a bolt or a post could be an alternative to hinge pins, as examples.

In FIGS. 3A-3D, both of the guiding members 220, 320 and the locking members 230, 330 are spring loaded to remain in a home or neutral position when no external forces are acting on the guiding members 220, 320 or on the locking members 230, 330. In various embodiments, a single spring provides tension to both the locking member and a corresponding guiding member. In the present embodiment, proximate to the first side 241*a* of the base 240, the first linkage 200 includes a first spring 232 that has one end coupled to a proximal end (closest to the base 240) of the guiding member 220 and its opposite end coupled to a proximal end of the locking member 230. The first linkage 200 could also include a second spring similarly oriented at the second side 241*b* of the base 240 and coupled to the proximal ends of the guiding member 220 and the locking member 230. In the present embodiment, proximate to the first side 341*a* of the base 340, the second linkage 300 includes a third spring 332 that has one end coupled to a proximal end of the guiding member 320 (closest to the base 340) and its opposite end coupled to a proximal end of the locking member 330. The second linkage 300 could also include a fourth spring similarly oriented at the second side 341*b* of the base 340 and coupled to the proximal ends of the guiding member 320 and the locking member 330.

In various embodiments, each guiding member 220, 320 includes a flat or substantially flat front surface 222, 322 along which the hitch coupling 156 can travel toward the hitch 110. Therefore, the front surface 222, 322 is configured as a guide surface for a hitch coupling. In various embodiments, the front surface 222, 322 can be substantially straight, flat, and smooth. In other embodiments, the front surface need not be straight; it could be curved or have curved portions. In some embodiments, the front surface could be concave or convex, or include at least one concave portion and/or at least one convex portion. In some embodiments, the front surface can include at least one curved portion and at least one straight portion. In some embodiments, the front surface can include portions that are not smooth. For example, some portions could be textured, or the entire front surface could be textured. The front surface 222, 322 is structured, shaped, and arranged to guide a hitch coupling to a hitch. Those skilled in the art will appreciate that the front surface can take different forms in different embodiments.

In various embodiments, the front surface 222, 322 of each guiding member 220, 320 can include at least one contact 228, 328. In some embodiments, each contact 228 can comprise at least one bumper, such as a rubber, silicone, or other durable cushioning piece. In some embodiments, the contact need not include at least one bumper. The contact 228 can be configured as a contact point for a hitch coupling during the guiding and capturing process and as a contact point for a hitch tongue 154 during a towing operation. In various embodiments, this contact point can also be formed from each guiding member 220/320.

In various embodiments, each guiding member 220, 320 can comprise a locking portion 225, 325 configured to engage with a respective locking member 230, 330. The locking portion 225, 325 can take the form of at least one notch, groove, recess, protrusion, or the like in different embodiments. In this embodiment, each locking portion 225, 325 comprises at least one notch formed at a distal end and rear side 224, 324 of the guiding member 220, 320. In this embodiment, each locking portion 225, 325 includes a plurality of notches. For example, in this embodiment, the locking portion 225 of the guiding member 220 include first notch 225*a* and second notch 225*b*. And, in this embodiment, the locking portion 325 of the guiding member 320 includes first notch 325*a* and second notch 325*b*. In various embodiments, the locking portion 225, 325 includes a stepped portion including the plurality of notches.

In various embodiments, each of the locking members 230, 330 is structured to include a distal end having a capture 234, 334 configured to engage a portion of the respective guiding member 220, 320 to lock the guiding member 220, 320 in place, i.e., in a fixed or locked position or linkage configuration. In various embodiments, each locking member 230, 330 the capture 234, 334 includes a U-shaped portion configured to engage a notch from the plurality of notches 225, 325 of the guiding member 220, 320. For example, the U-shaped capture 234 of the locking member 230 can be configured to engage the first notch 225*a* of the guiding member 220 in a first locked position and engage the second notch 225*b* in a second locked position. The linkage 300 can include similar parts, structured and arranged for similar operations, including first and second locking positions.

In various embodiments, the locking member 230, 330 is also structured to include a distal end having a portion that includes the release 238, 338 that, when engaged, disengages the locking member 230, 330 from its corresponding guiding member 220, 320. In some embodiments, the release 238, 338 extends beyond or in front of the front face 222, 322 of the guiding member 220, 230. In some embodiments, the release 238, 338 passes though an opening defined at a distal end of the corresponding guiding member 220, 320. Therefore, at least a portion of the release 238, 338 is engageable from and/or through the front surface 222, 322 of the guiding member 220, 320.

In some embodiments, the release 238, 338 includes at least one bumper, such as a rubber, silicone, or other durable cushioning piece. The release or bumper 238, 338 can be configured as a contact point for a hitch coupling during the guiding and capturing process and as a contact point for a hitch tongue 154 during a towing operation. For example, the bumper can extend past the front face of the guiding member 220, 320 so that the release/bumper is engageable from and/or through the front surface 222, 322 of the guiding member 220, 320. In some embodiments, the release 238, 338 need not include a bumper.

The locking member 230, 330 is also formed such that when the hitch coupling 156 is captured, e.g., a tow ring is physically engaged with a pintle hitch 110, the locking member 230, 330 can be moved out of a locking position when engaged by a part of the payload structure, e.g., a tongue 154 of the cart 150, thereby unlocking the guiding member 220, 320 to enable the guiding member to move freely within a defined, extended range of motion. In this embodiment, the hitch guide 120 includes the two linkages 200, 300, one on either side of the hitch 110. In various embodiments, each linkage enables an extended range of motion for the cart 150 and/or its tongue 154 of up to about ±100 (±θ) degrees about a vertical axis Z passing through the engagement of the hitch coupling 156 and the hitch 110. Together, the two linkages, one left and one right of the hitch 110, can enable an extended range of motion for the cart 150 and/or its tongue 154 of up to about 180 degrees about the vertical axis Z passing through the engagement of the hitch coupling 156 and the hitch 110.

Guided Capture

The hitch guide 120 includes linkages 200, 300 that can mechanically adapt based on an initial point of contact by a hitch coupling 153. In various embodiments, if the hitch coupling 153 initially contacts the guiding member 220, 320, the locking member 230, 330 locks the guiding member 220, 320 in a first locked position. In various embodiments, if the hitch coupling 153 initially contacts the locking member 230, 330, the locking member releases the guiding member 220, 320 from the first locked position so that the guiding member can open wider. Then, the locking member 230, 330 locks the guiding member 220, 320 in a second locked position, wherein an angle of the guiding member 220, 320 is with respect to the central axis X in the second locked position. In various embodiments, as the hitch coupling 153 travels down the front face of the guiding member toward the hitch, the guiding member can return to the first locked position.

While guiding the hitch coupling 156 toward the hitch 110 for capture, each linkage 200, 300 is structured and arranged such that, in response to initial contact by the hitch coupling 156, the locking member 230, 330 engages and locks the guiding member 220, 320 to limit and/or prevent movement of the guiding member 220, 320, e.g., in the horizontal direction toward the vehicle 100. Otherwise, during the process of guiding the hitch coupling 156 toward the hitch 110, each of the two linkages 200, 300 is structured and arranged such that in response to initial contact of a release 226 of the locking member 230 by the hitch coupling 156, the locking member 230 disengages and unlocks (or releases) the guiding member 220 to enable movement of the guiding member 220, e.g., rotation in the horizontal direction, which allows the linkage to further open (outward and toward the vehicle) so that the hitch coupling engages the guiding member 220, 320 after initially engaging the release surface 238, 338 of the locking member 230, 330. In either case, the guiding member 220, 320 ultimately guides the hitch coupling 156 to be captured by the hitch 110.

Figure 5:
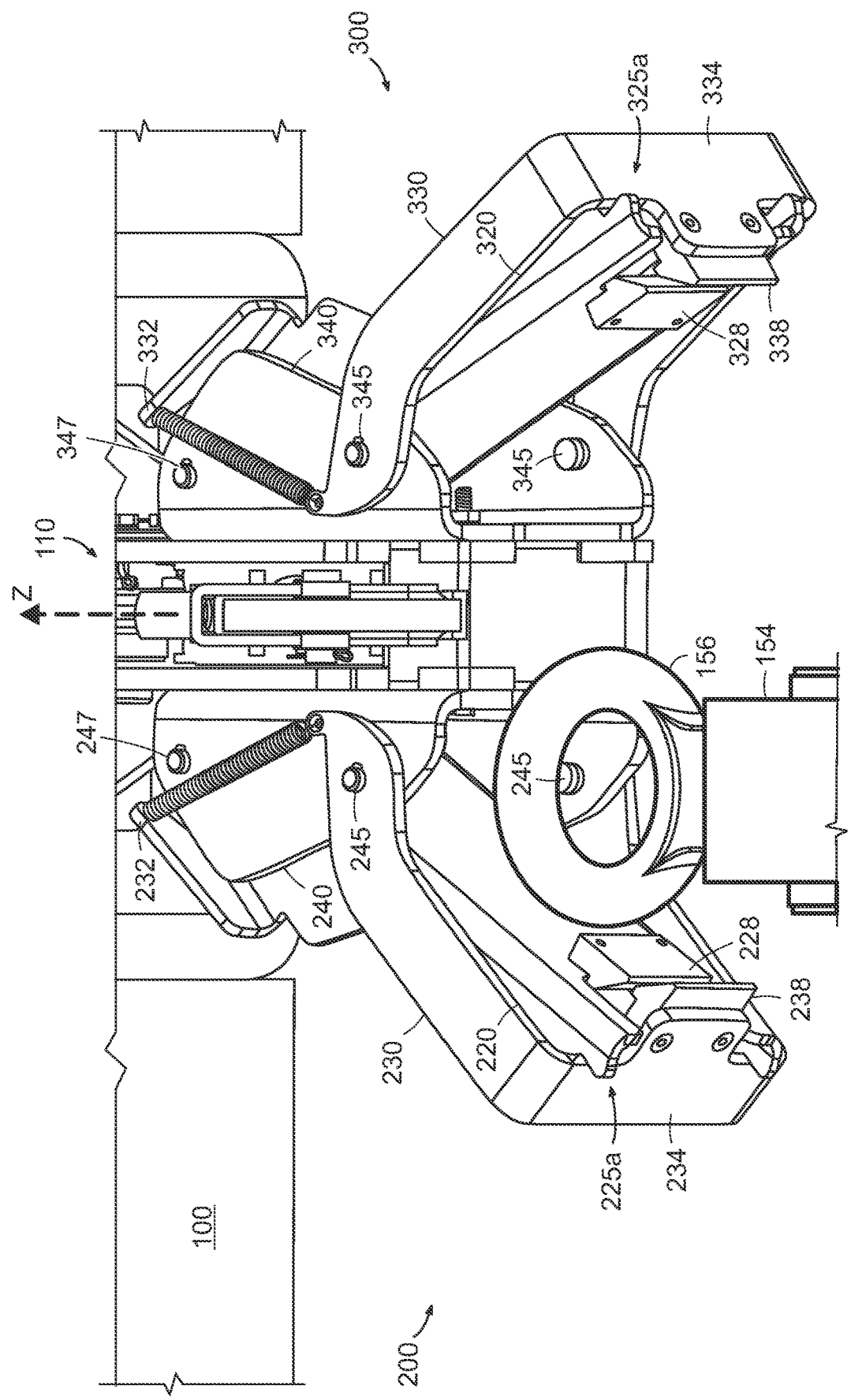
FIG. 5 is a perspective view of the hitch guide of FIG. 3A guiding a tow ring, in accordance with aspects of the inventive concepts.

FIG. 5 is a perspective view illustrating an embodiment of a guided capture by the hitch guide 120 of FIGS. 3A-3D, in accordance with aspects of the present invention. In this embodiment, the hitch coupling 156 has contacted linkage 200 at a front face 222 of the guiding member 220. The locking member 230 has locked the guiding member 220 in place. In FIG. 5, the U-shaped capture 234 of the locking member 230 is engaged with the first notch 225a of the guiding member to lock the guiding member in place. As the coupling ring 156 at the end of the tongue 154 of the cart 150 engages with the front face 222 of the guiding member 220, the hitch guide 120 is maintained in the locked position or state. When the guiding member 220 is locked in place it acts as a rigid guide to the coupling ring 156, and the coupling ring 156 is directed toward the jaw of the hitch 110. In the locked position or state, the pressure applied to the guiding member 220 by the coupling ring 156 pushes the first notch 225a of the guiding member and the capture 234 at the distal end of the locking member 230 into a locked engagement, thereby locking the guiding member 220 in place.

Post-Capture Adjustments

Figure 6A:
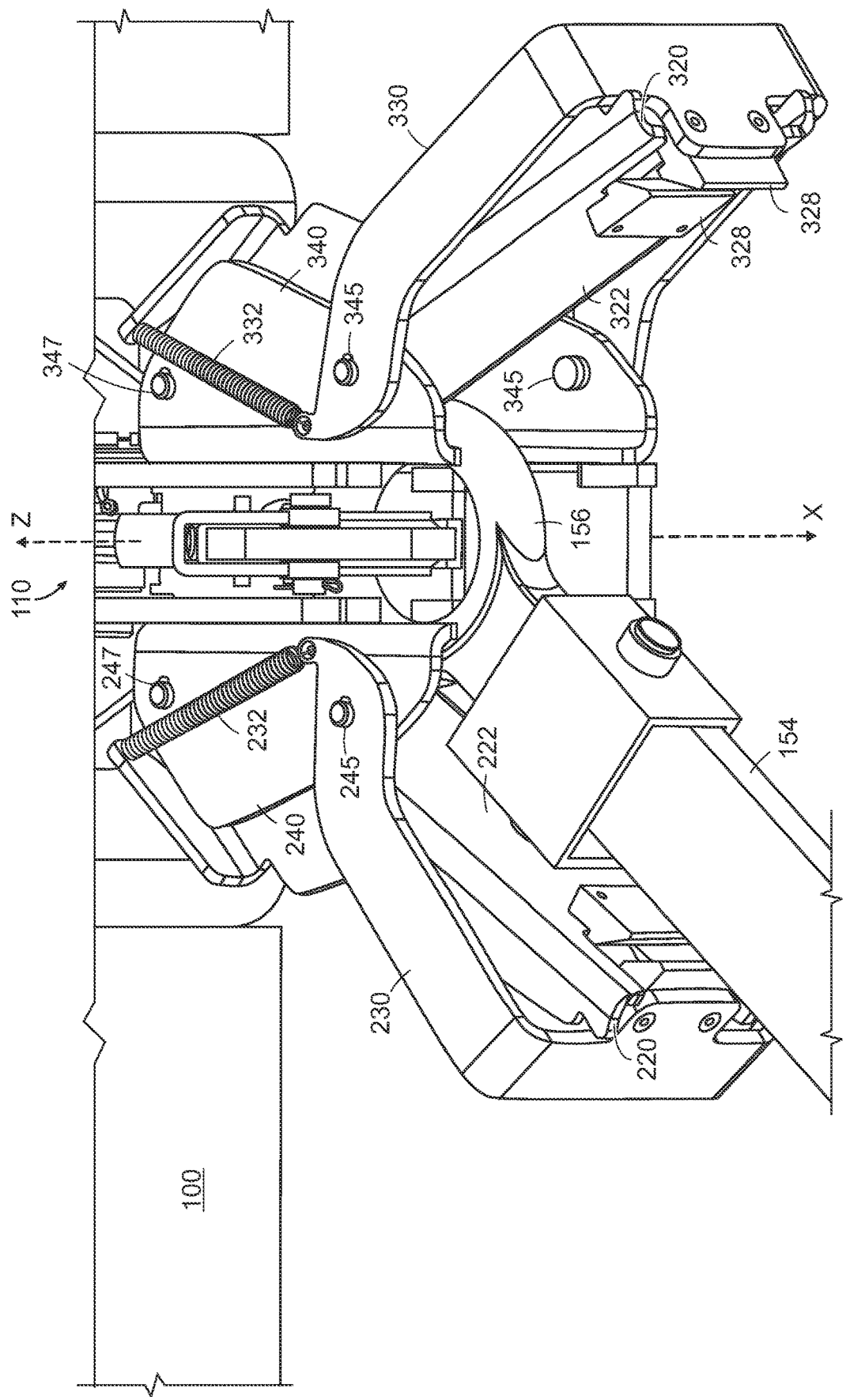
Figure 7A:
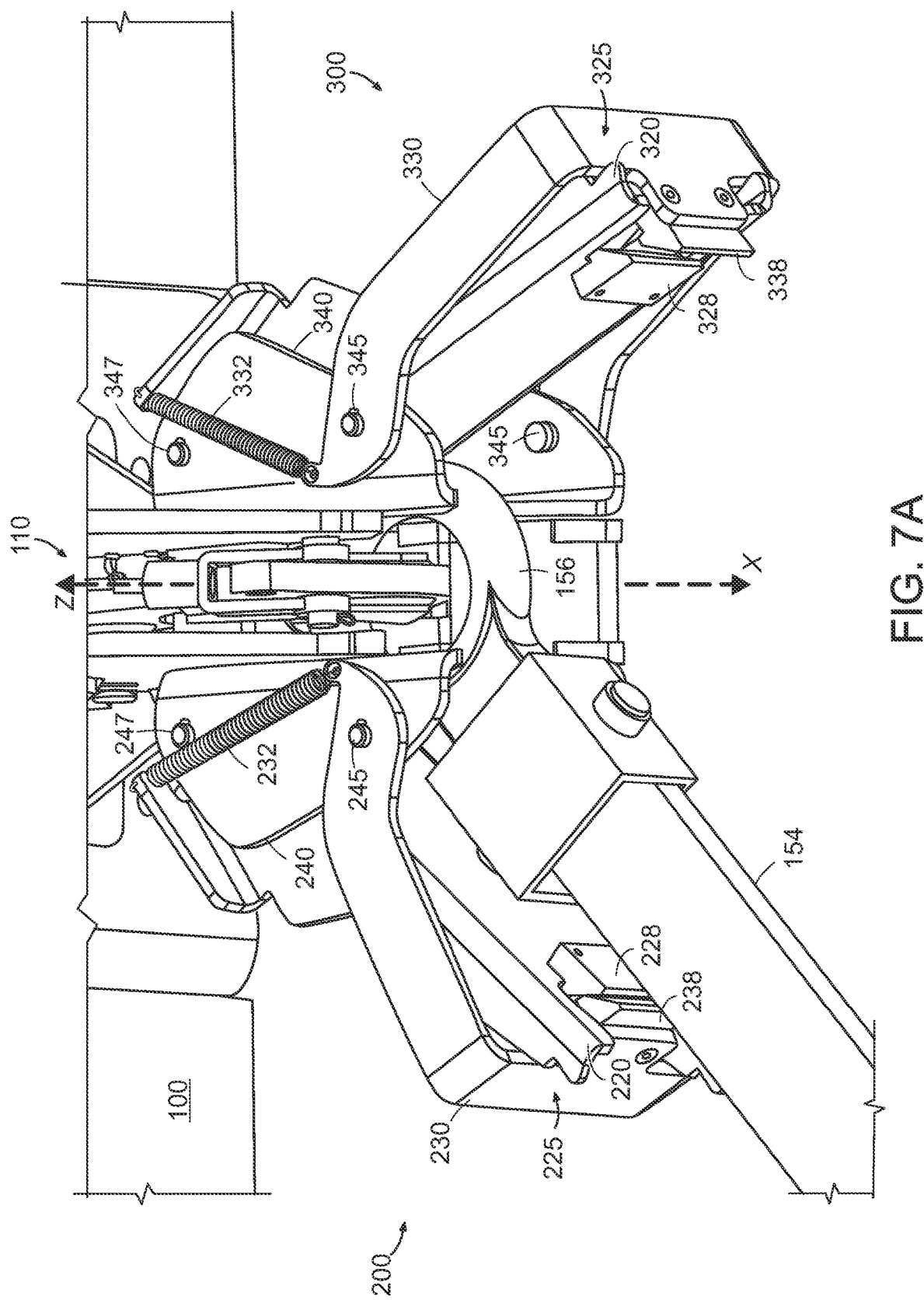
FIGS. 7A through 7C are perspective views of the hitch guide of FIG. 3A with the tow ring captured, in accordance with aspects of the inventive concepts.
Figure 7B:
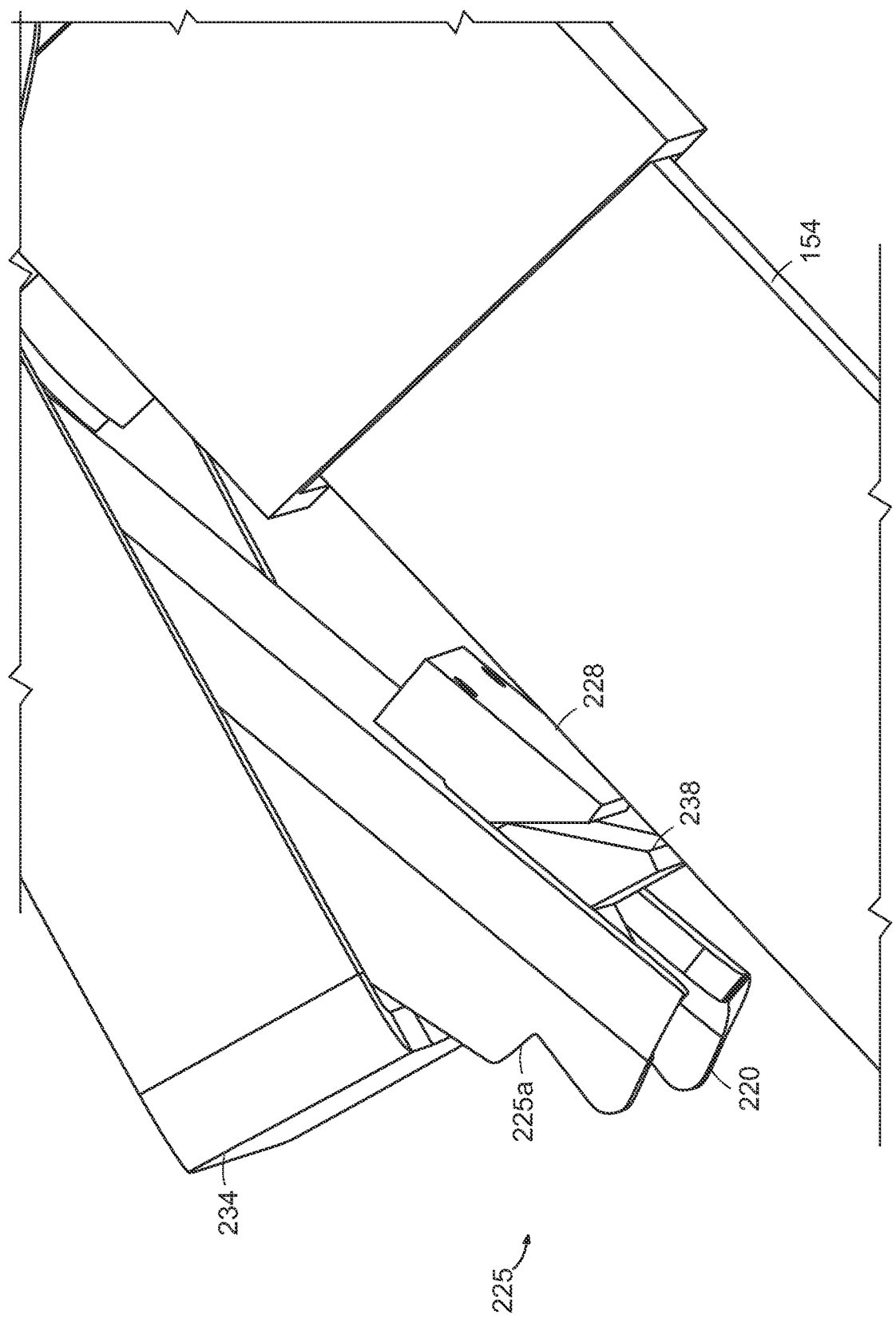
Figure 7C:
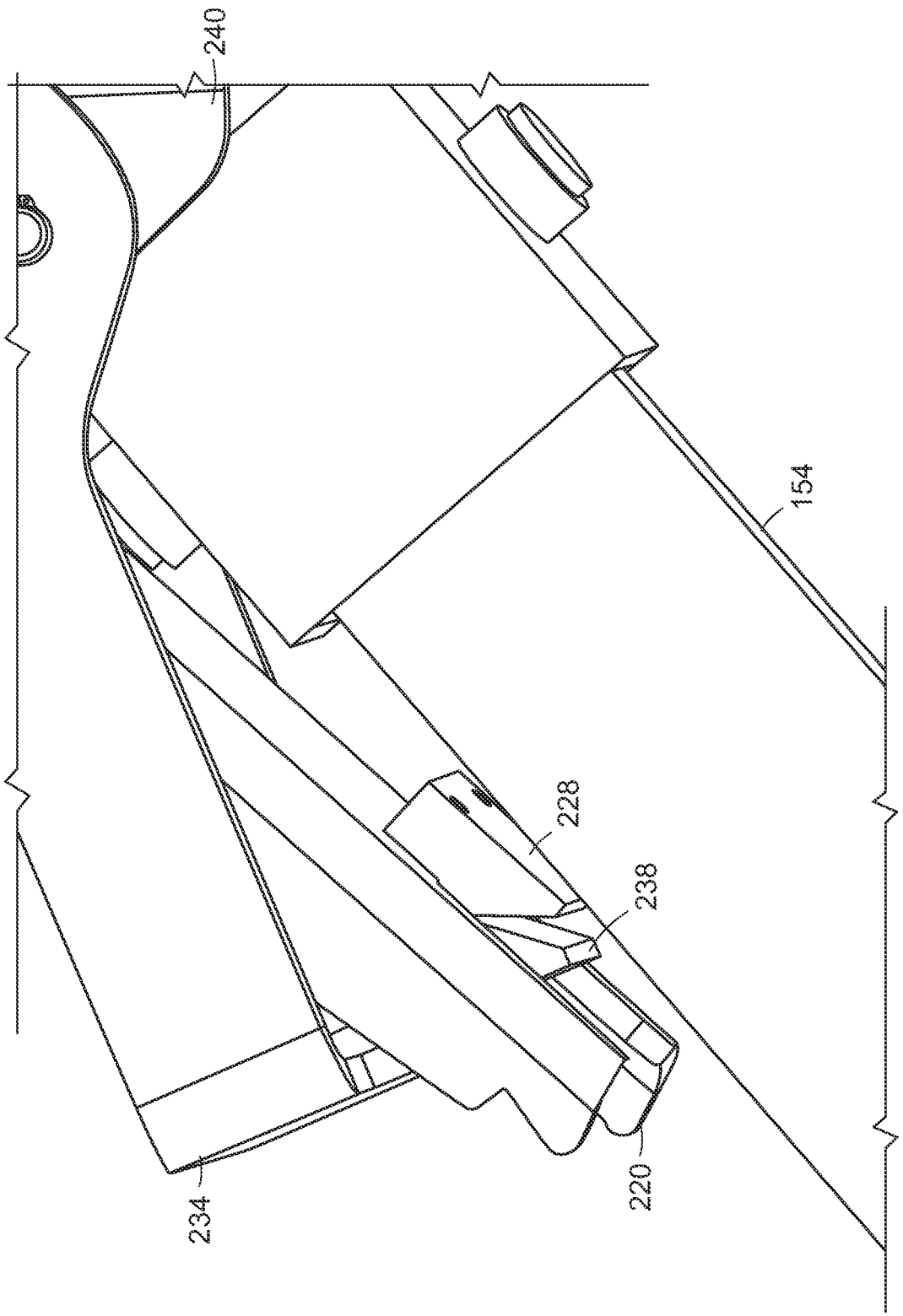

FIGS. 6A and 6B are perspective views of the hitch guide 120 of FIG. 3A with the tow ring captured and partially rotated, in accordance with aspects of the inventive concepts. FIGS. 7A through 7C are perspective views of the hitch guide 120 of FIG. 3A with the tow ring captured and further rotated, in accordance with aspects of the inventive concepts. And FIG. 8 is another perspective view of the hitch guide 120 of FIG. 3A with the tow ring 156 captured and a cart tongue 154 at about 100 degrees from a central axis X, in accordance with aspects of the inventive concepts.

Referring to FIGS. 6A-6B, the tow ring 156 has been captured by the hitch 110. After capture, the vehicle 100 has initiated a turn, such as a left turn, causing the cart 150 and its cart tongue 154 to rotate about the hitch axis Z. Therefore, the cart tongue is rotated off of and away from the central axis X, about the hitch axis Z.

As the cart tongue 154 rotates, it first contacts release (bumper) 238 of the locking member 230. This contact disengages the guiding member 220 and the locking member 230. In various embodiments, this contact pushes the locking member 230, causing it to rotate outward relative to its base 240, toward the vehicle, and away from the central axis X This rotation disengages the U-shaped capture 234 from the first notch 225a of the guiding member 220. By unlocking the guiding member 220, the guiding member is free to rotate outward relative to the base, toward the vehicle, and away from the central axis X The locking member 230 rotates about the axis defined by hinge pins 245 and the guiding member 220 rotates about the axis defined by hinge pins 247. The spring 232 biases the guiding member 220 and the locking member 230 together, in the absence of external forces, e.g., from the tow ting 156 or tongue 154. In various embodiments, linkage 300 operates in the same manner as described for linkage 200.

Referring to FIGS. 7A-7C, the cart 150 and tongue 154 continue to rotate relative to the central axis X and the vertical hitch axis Z. In these figures, the tongue is rotated to a greater degree than in FIGS. 6A-6B. In these figures, the guiding member 220 is disengaged and unlocked from the locking member by the external force of the rotating tongue 154 applied to the locking member. Since the guiding member 220 and the locking member 230 have different axes of rotation, their travel paths differ. As the rotation continues, the tongue eventually simultaneously contacts the release/bumper 238 of the locking member 230 and the contact/bumper 228 of the guiding member 220, at least for a portion of their travels, e.g., see FIG. 7B.

As the rotation of the tongue 154, the guiding member 220, and the locking member 230 continues further, the locking member distal end is pushed further rearward by the guiding member 220 until the release bumper 238 of the locking member 230 no longer contacts the tongue 154 and the tongue primarily or solely contacts the contact/bumper 228 of the guiding member 220, e.g., see FIG. 7C. As the rotation continues, the locking member and its release/bumper 238 slides further behind the guiding member. The guiding member pushes the locking member rearward as the guiding member further rotates away from the central axis X.

Referring to FIG. 8, the cart 150 and tongue 154 continue to rotate relative to the central axis X and the vertical hitch axis Z. In these figures, the tongue is rotated to a greater degree than in FIGS. 7A-7C. In these figures, the guiding member 220 continues to be disengaged and unlocked from the locking member and the tongue continues to provide an external rotational force to the guiding member. Since the guiding member 220 and the locking member 230 have different axes of rotation, their travel paths differ. As the rotation continues, the tongue primarily or only contacts the contact/bumper 228 of the guiding member 220, as the guiding member continues to rotate outwardly, toward the vehicle and away from the central axis X. Through this rotation, the guiding member applies a rotational force to the locking member so that the guiding member and the locking member simultaneously rotate to accommodate rotations of the tongue. In FIG. 8, the tongue is rotated about 100 degrees with respect to the central axis X The stop 242 of base 240 ultimately limits the rotation of the guiding member to ensure that the tongue does not impact the vehicle 100.

As the force from the tongue 154 is removed and the tongue rotates back toward the central axis X, the guiding and locking members ultimately return to their original positions, e.g., a home position, when the tongue no longer applies a force to linkage 200. The spring or springs 232 coupling the locking member and the guiding member supply the necessary forces to return the locking member and guiding member to their home positions.

Figure 9:
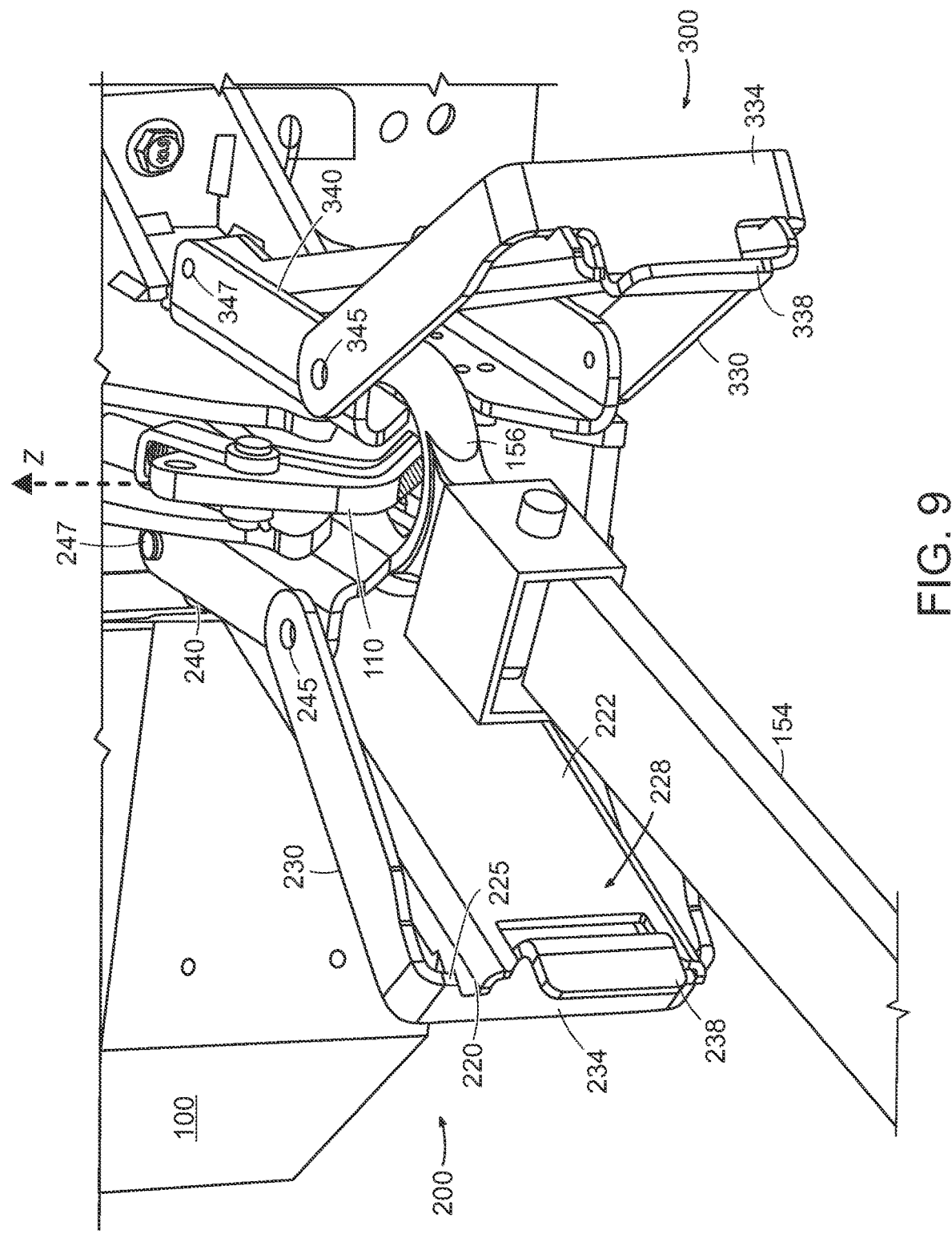
FIG. 9 is a perspective view of another embodiment of a hitch guide, in accordance with aspects of the inventive concepts.
Figures 10A, 10B:
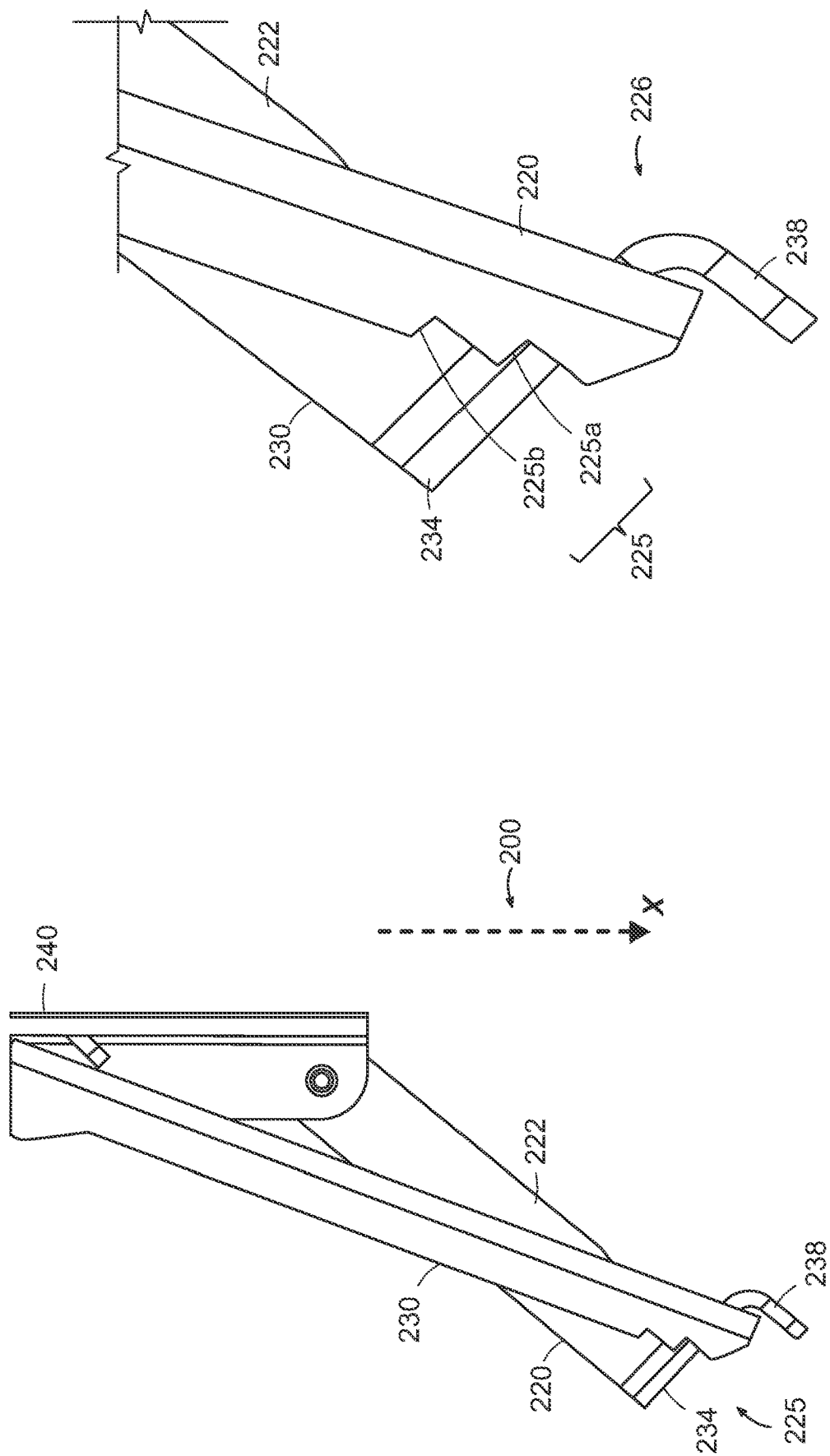
FIG. 10A is a top view of the hitch guide of FIG. 9, in accordance with aspects of the inventive concepts.
FIG. 10B is a top view of a portion of the hitch guide of FIG. 9, in accordance with aspects of the inventive concepts.
Figure 10C:
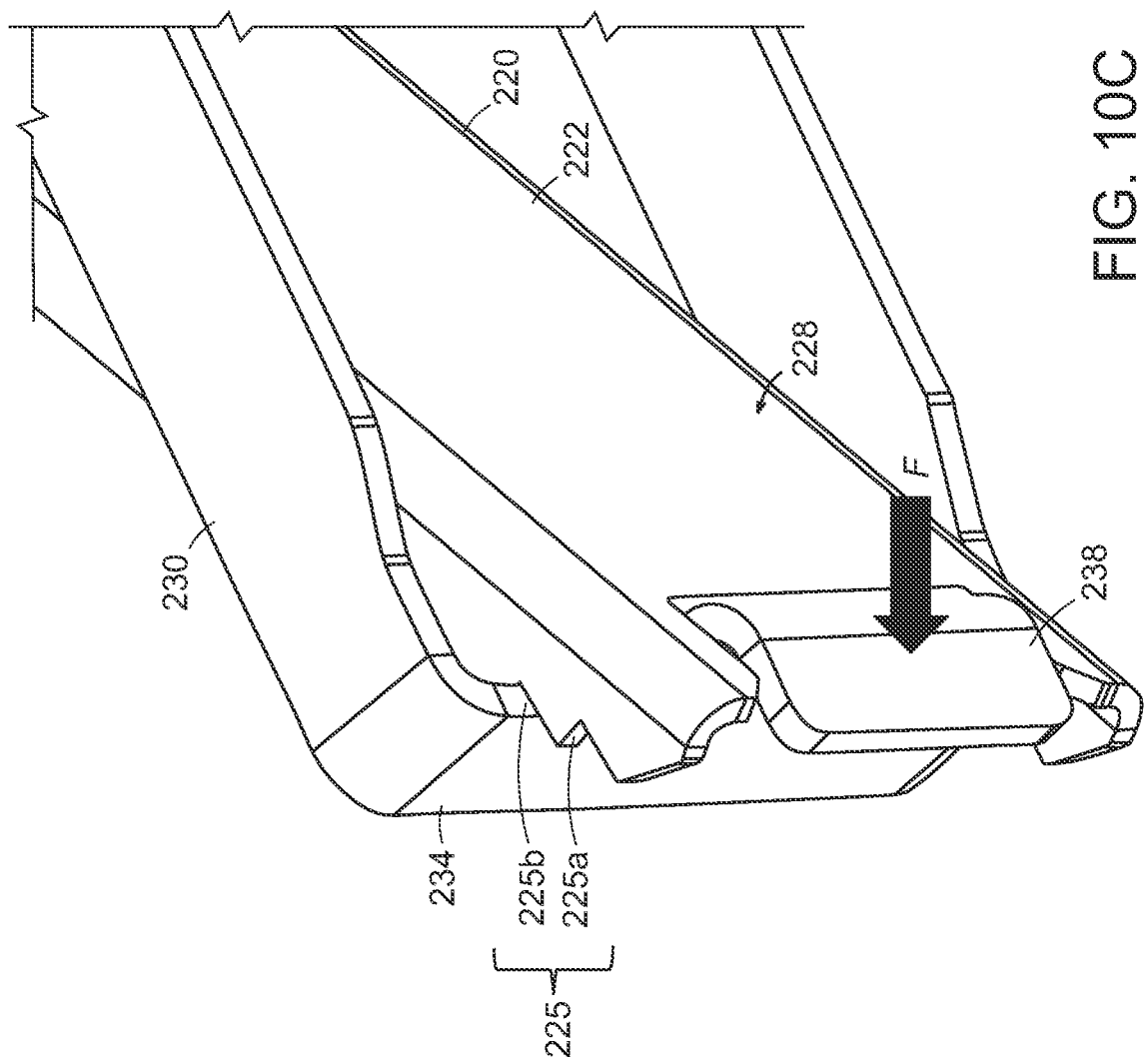
FIGS. 10C-10E are perspective views of portions of the hitch guide of FIG. 9 with a captured tow ring, in accordance with aspects of the inventive concepts.
Figure 10D:
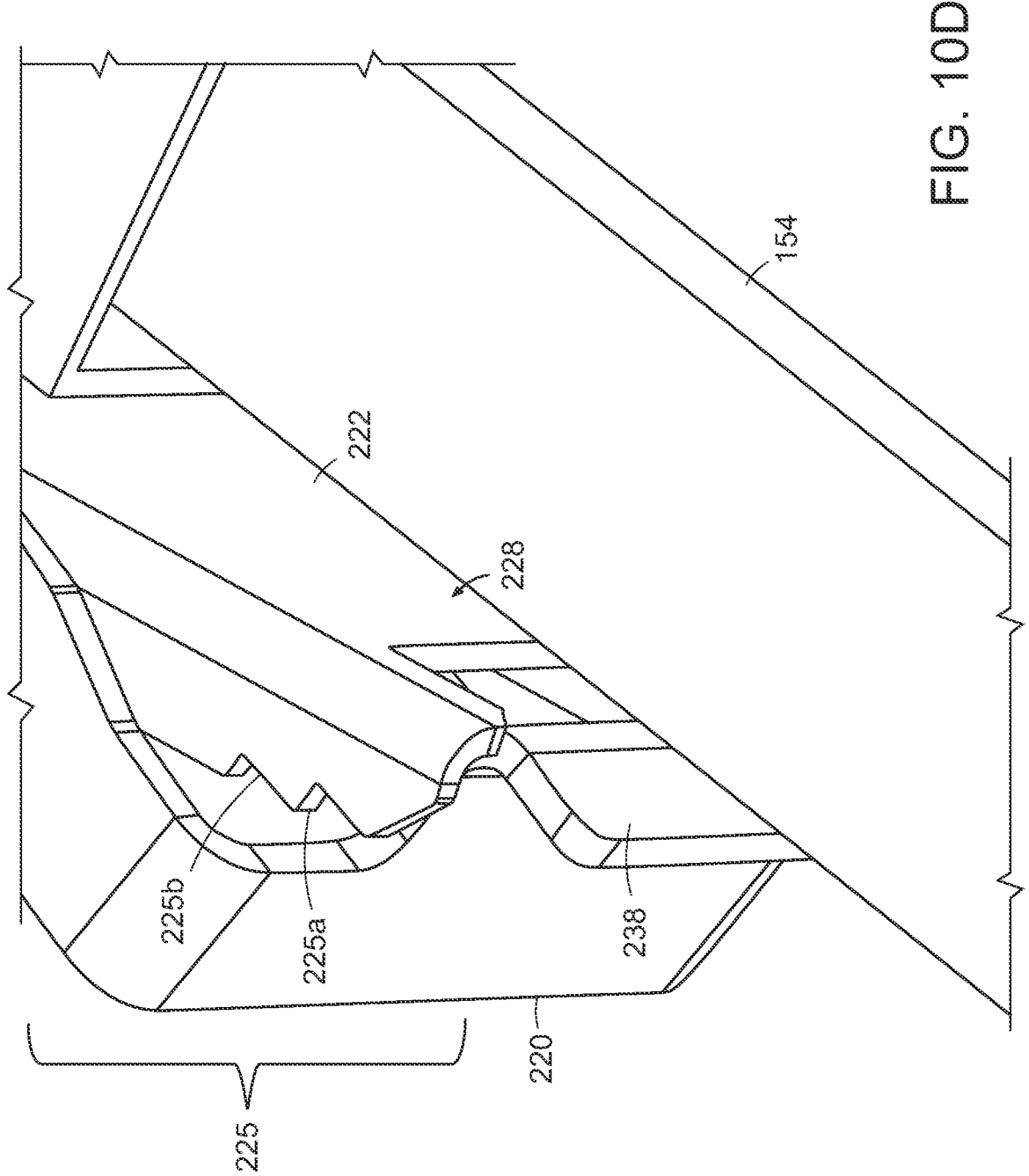
Figure 10E:
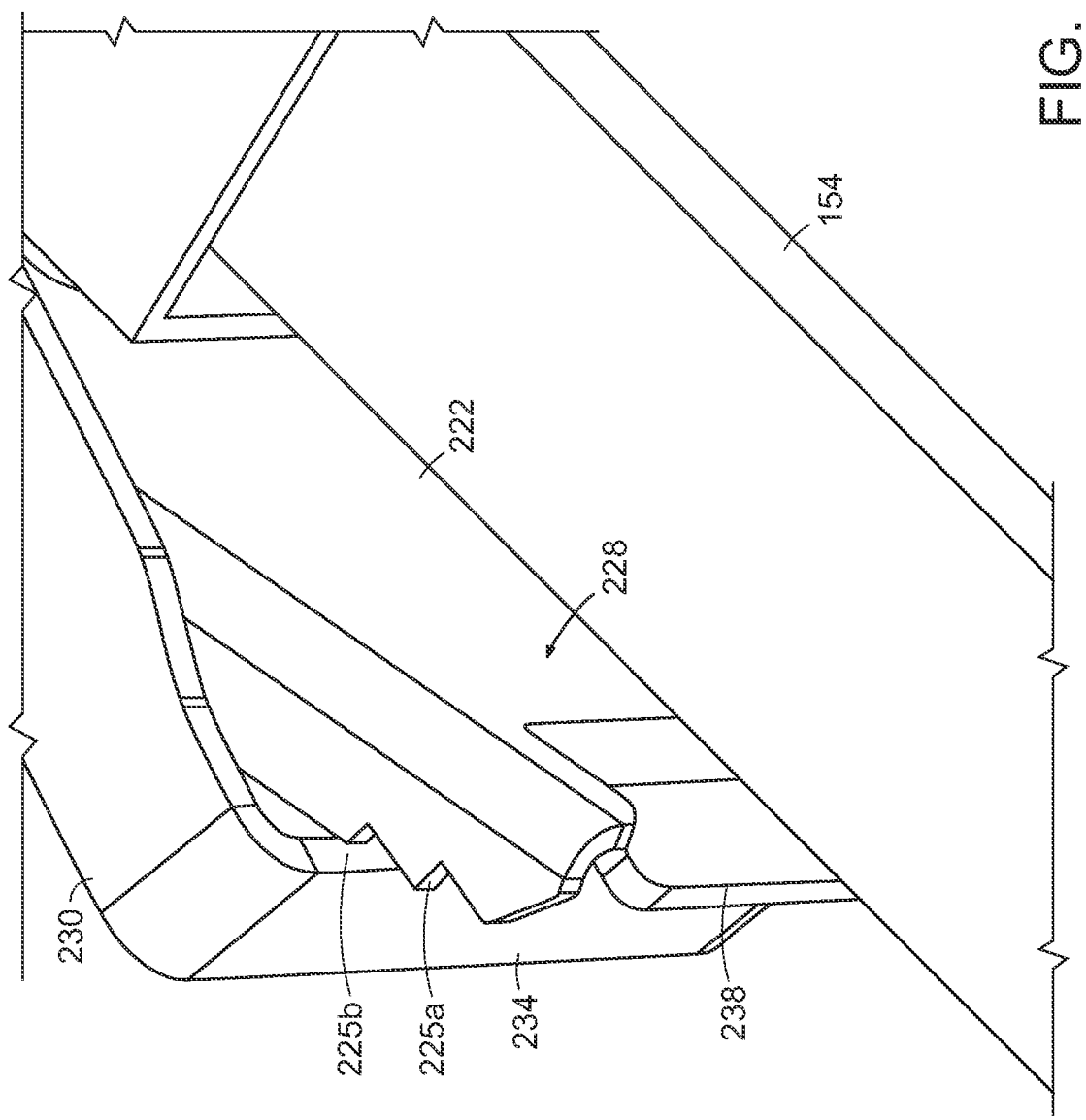

FIG. 9 is a perspective view of another embodiment of a hitch guide, in accordance with aspects of the inventive concepts. FIG. 10A is a top view of the hitch guide of FIG. 9, in accordance with aspects of the inventive concepts. FIG. 10B is a top view of a portion of the hitch guide of FIG. 9, in accordance with aspects of the inventive concepts. And FIGS. 10C-10E are perspective views of portions of the hitch guide of FIG. 9 with a captured tow ring, in accordance with aspects of the inventive concepts. In the embodiment of FIGS. 9-10E, elements corresponding to like elements in the embodiment of FIGS. 3A-8 have the same reference numbers.

In this embodiment, the guiding member 220 has an open distal end, furthest from the hitch 110. The release 238 of the locking member 230 can move though the open distal end of the guiding member 230, e.g., in response to an external force by the tow ring 156 or tongue 154. While not shown, one or more springs may connect between the guiding member and locking member to bias the two members back to the home position as an external force is removed.

Referring to FIG. 9, the tow ring 156 has been captured by the hitch 110. The tongue 154 of the cart 150 has not been rotated relative to the central axis X and the vertical hitch axis Z sufficiently to contact either linkage 200, 300.

FIG. 10A shows a top view of linkage 200 of FIG. 9 with a top half of the locking member 230 cutaway and removed. Therefore, in this view, a cross section of locking member 230 is shown. FIG. 10B shows a portion of the same view as FIG. 10A. In these views, the U-shaped capture 234 of the locking member 230 is engaged with the first notch 225a of the guiding member 220, thereby locking the guiding member in place. In various embodiments, this arrangement is the home position of the guiding member and locking member, without external forces applied. This position is also the guide position when a tow ring engages or contacts the front face 222 of the guiding member during the guide and capture process.

FIG. 10C shows that the release 238 of the locking member 230 has been pushed outwardly by a force F, which could be applied by the tow ring 156 during the guide and capture process or by the cart tongue 154 after capture and during transit when the vehicle 100 and cart 150 engage in a turn. In this embodiment, when the release 238 and locking member 230 are pushed and rotated outwardly, the U-shaped capture 234 disengages from the first notch 225a of the guiding member 220, thereby releasing the guiding member from its first locked position or state. In various embodiments, after the U-shaped capture 234 releases, it then engages the next notch 225b, from the plurality of notches 225, to lock the guiding member in a second locked position or state.

This transition from the first locked position or state to the second locked position or state can occur when the tow ring initially contacts the release 238 of the locking member, rather than the front face 222 or contact 228 of the guiding member. Contacting the release 238 allows the linkage to increase its angle relative to the central axis X, thereby opening the linkage to accommodate tow rings substantially offset from the central axis X The tow ring, after contacting the release 238 and opening the linkage and guiding member, then travels down the front face 222 of the guiding member to be captured by the hitch 110. In this manner, the hitch guide 120 is adaptable to accommodate tow rings (or other hitch couplings) offset from the hitch to a greater degree than if the guide were not adaptable.

Referring to FIGS. 10D-10E, portions of the linkage 200 of FIG. 9 are shown. In FIG. 10D, the tongue 154 has applied an external force to the release 238 of the locking member 230, which has disengaged the locking member U-shaped capture from the notches 225 of the guiding member 220. In FIG. 10E, as the tongue continues to apply an external force to the release 238, the locking member 230 and the guiding member 220 rotate outwardly, away from the central axis X and toward the vehicle. As the rotation of the guiding member and locking member increase relative to the central axis X, the locking member slides behind the guiding member and the tongue applies the external force to the contact 228 of the guiding member. Therefore, after capture of the tow ring 156, as the tongue 154 rotates outwardly about the vertical hitch axis Z, the force from the tongue is initially applied to the locking member and then transitions to the guiding member.

As will be apparent to those skilled in the art having the benefit of this disclosure, a hitch guide according to the embodiments of the present invention expands the types of carts that can be accommodated with an auto-hitch system, without placing additional limits on maneuverability of the system. The hitch guide is adaptable to allow for wider guiding and capture and, after capture, an improved turning radius over prior hitches and hitch guides.

The hitch guide according to aspects of the inventive concepts includes a plurality of movable members which that mechanically adapt in response to different applied forces. In some cases, the members are locked to provide a rigid guide to a tow ring or other hitch coupling mechanism. In other cases, the members unlock to open and allow an expanded, defined range of motion, e.g., during tight radius turns.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It will be understood that the inventive concepts can be defined by any combination of the claims, regardless of the stated dependencies, wherein different combinations of claims can represent different embodiments of the inventive concepts.

What is claimed is:

1. A hitch guide apparatus, including:
   at least one linkage configured to couple to a vehicle and/or a hitch, the apparatus comprising:
     a moveable guiding member configured to direct a hitch coupling to a hitch location; and
     a moveable locking member responsive to an external force to lock the guiding member in at least one locked position and to disengage from and release the guiding member depending on a contact point of the external force on the guiding member and/or the locking member, wherein the locking member is configured to lock the guiding member in a locked position in response to a force applied to the guiding member by the hitch coupling.

2. The apparatus of claim 1, wherein the locking member is configured to disengage from and release the guiding member from a locked position when the external force is applied to the locking member.

3. The apparatus of claim 1, wherein the locking member is configured to lock the guiding member in a locked position when the external force is transitioned from the locking member to the guiding member.

4. The apparatus of claim 1, wherein the locking member and the guiding member are rotatable relative to the hitch.

5. The apparatus of claim 4, wherein the locking member and the guiding member are configured to rotate about different axes.

6. The apparatus of claim 5, wherein the different axes are parallel to each other.

7. The apparatus of claim 4, wherein the guiding member and the locking member are rotatable up to about 90 degrees away from the hitch.

8. The apparatus of claim 1, further comprising:
a base configured to couple to the vehicle and/or the hitch, wherein the locking member and/or the guiding member are coupled to the base.

9. The apparatus of claim 8, wherein:
the guiding member is rotatably coupled to the base at a first axis; and
the locking member is rotatably coupled to the base at a second axis that is parallel to the first axis.

10. The apparatus of claim 8, wherein the base comprises a stop configured to limit the rotation of the guiding member and/or the locking member.

11. The apparatus of claim 1, wherein the locking member is configured to lock the guiding member in one of a plurality of locked positions.

12. The apparatus of claim 11, wherein the locking member is configured to disengage from and release the guiding member to enable the guiding member to transition from a first locked position to a second locked position.

13. The apparatus of claim 12, wherein an angle of the guiding member to the hitch is greater in the second locked position than in the first locked position.

14. The apparatus of claim 11, wherein the locking member is configured to disengage and release the guiding member from any of the plurality of locked positions to enable the guiding member to move freely within a defined range of motion.

15. The apparatus of claim 1, wherein the locking member and the guiding member are each biased to a home position by one or more springs when the external force is not applied.

16. The apparatus of claim 15, wherein:
the guiding member has a distal end that includes a contact surface configured to receive the external force;
the locking member has a distal end that includes a release surface configured to receive the external force, and
in the home position, the release surface of the locking member extends beyond the contact surface of the guiding member.

17. The apparatus of claim 16, wherein, in the home position, the release surface of the locking member extends through an opening defined by or in the guiding member.

18. The apparatus of claim 1, wherein the guiding member and the locking member have coplanar travel paths.

19. The apparatus of claim 1, wherein the guiding member and the locking member rotate within the same plane about different axes.

20. The apparatus of claim 1, wherein:
the locking member includes at least one notch configured to receive a portion of the guiding member to lock the guiding member in the at least one locked position; and/or
the guiding member includes at least one notch configured to receive a portion of the locking member to lock the guiding member in the at least one locked position.

21. The apparatus of claim 1, wherein the at least one linkage includes a first linkage and a second linkage configured to be coupled to the vehicle and/or hitch on opposite sides of the hitch.

22. The apparatus of claim 21, wherein:
the first linkage comprises:
a first movable guiding member configured to direct a hitch coupling to a hitch location; and
a first moveable locking member responsive to an external force to lock the first guiding member in at least one locked position and to disengage from and release the first guiding member depending on a contact point of the external force on the first guiding member and/or the first locking member; and
the second linkage comprises:
a second moveable guiding member configured to direct a hitch coupling to a hitch location; and
a second moveable locking member responsive to an external force to lock the second guiding member in at least one locked position and to disengage from and release the second guiding member depending on a contact point of the external force on the second guiding member and/or the second locking member.

* * * * *